(12) United States Patent
Chang et al.

(10) Patent No.: US 12,179,782 B2
(45) Date of Patent: Dec. 31, 2024

(54) PACKAGE DELIVERY GUIDANCE AND ASSISTANCE SYSTEM USING VEHICLE SENSOR DATA

(71) Applicant: Amazon Technologies, Inc., Seattle, WA (US)

(72) Inventors: Ching Pin Chang, Santa Clara, CA (US); Cassandra Goodby, Erie, CO (US); Francesco Sacchi, Darien, CT (US); Morgan Rose Goldstein, Venice, CA (US); Paul Barclay, Seattle, WA (US); Tirthankar Sengupta, Sammamish, WA (US)

(73) Assignee: Amazon Technologies, Inc., Seattle, WA (US)

( * ) Notice: Subject to any disclaimer, the term of this patent is extended or adjusted under 35 U.S.C. 154(b) by 207 days.

(21) Appl. No.: 17/747,716

(22) Filed: May 18, 2022

(65) Prior Publication Data

US 2024/0092377 A1    Mar. 21, 2024

(51) Int. Cl.
*B60K 35/00*   (2024.01)
*B60W 50/14*   (2020.01)
(Continued)

(52) U.S. Cl.
CPC ............ *B60W 50/14* (2013.01); *B60K 35/00* (2013.01); *G06Q 10/0833* (2013.01);
(Continued)

(58) Field of Classification Search
CPC ........ B60K 35/00; B60K 35/28; B60K 35/29; B60K 2360/161; B60K 2360/166;
(Continued)

(56) References Cited

U.S. PATENT DOCUMENTS

2013/0265178 A1* 10/2013 Tengler .................. H04W 4/00
                                                        340/989
2019/0111871 A1   4/2019 Kim et al.
(Continued)

FOREIGN PATENT DOCUMENTS

CN        113432619 A      9/2021

OTHER PUBLICATIONS

PCT, "International Search Report and Written Opinion" Application No. PCT/US2023/067092, mailed Jul. 28, 2023, 15 pages.

*Primary Examiner* — Jess Whittington
*Assistant Examiner* — Rami Nabih Bedewi
(74) *Attorney, Agent, or Firm* — Eversheds Sutherland (US) LLP

(57) ABSTRACT

Systems, devices, and methods are provided for package delivery guidance and assistance. A vehicle may comprise one or more sensors. A processing unit of the vehicle may determine, based on vehicle data obtained from the one or more sensors, that the vehicle is in a first state, determine that the first state corresponds to a first sub-task of the plurality of sub-tasks, determine a first graphical interface for performance of the first sub-task, present the first graphical interface on a first display screen of the at vehicle, responsive to additional vehicle data obtained from the one or more sensors indicating that the vehicle is in a second state: determine that the second state corresponds to a second sub-task of the plurality of sub-tasks, and update the first display screen with a second graphical interface that is for performance of the second sub-task.

20 Claims, 20 Drawing Sheets

(51) Int. Cl.
  *G06Q 10/08* (2024.01)
  *G06Q 10/0833* (2023.01)
  *H04W 4/021* (2018.01)
  *H04W 4/48* (2018.01)
  *B60K 35/10* (2024.01)
  *B60K 35/23* (2024.01)
  *B60K 35/28* (2024.01)
  *B60K 35/29* (2024.01)
  *B60K 35/80* (2024.01)
  *B60K 35/81* (2024.01)
  *B60K 35/85* (2024.01)

(52) U.S. Cl.
  CPC ............. *H04W 4/021* (2013.01); *H04W 4/48* (2018.02); *B60K 35/10* (2024.01); *B60K 35/23* (2024.01); *B60K 35/28* (2024.01); *B60K 35/29* (2024.01); *B60K 35/80* (2024.01); *B60K 35/81* (2024.01); *B60K 35/85* (2024.01); *B60K 2360/11* (2024.01); *B60K 2360/166* (2024.01); *B60K 2360/184* (2024.01); *B60K 2360/1868* (2024.01); *B60K 2360/577* (2024.01); *B60K 2360/589* (2024.01); *B60W 2050/146* (2013.01); *B60W 2556/50* (2020.02)

(58) Field of Classification Search
  CPC ........ B60K 2360/1876; G01C 21/3647; G01C 21/365; G01C 21/3697; G06F 3/0481; G06F 3/0488; G06Q 10/08; G06Q 10/083
  See application file for complete search history.

(56) References Cited

U.S. PATENT DOCUMENTS

| | | |
|---|---|---|
| 2021/0129870 A1 | 5/2021 | Jung |
| 2022/0003559 A1 | 1/2022 | Valdez et al. |
| 2022/0044198 A1* | 2/2022 | Meister .............. G06Q 10/0833 |
| 2022/0198537 A1* | 6/2022 | Edwards .............. G01C 21/343 |
| 2023/0120933 A1* | 4/2023 | Kim .................... B60W 50/14 |
| | | 345/633 |
| 2023/0236659 A1* | 7/2023 | Wan .................. G01C 21/3697 |
| | | 701/436 |

* cited by examiner

PACKAGE DELIVERY GUIDANCE AND ASSISTANCE SYSTEM USING VEHICLE SENSOR DATA

BACKGROUND

"Last-mile delivery" refers to a logistics term used to describe the transportation of a package from a fulfillment center to the package's final destination. The goal of a last mile carrier is to deliver the item as quickly and cost-effectively as possible. There are many challenges involved in the last-mile delivery. In many cases, an individual is tasked with making the last-mile delivery by arriving at a warehouse or fulfillment center, loading a delivery vehicle with many packages to be delivered, and following a designated route to make the deliveries. Delivery personnel are often tasked with performing a wide range of responsibilities, including reviewing a proposed delivery route, driving a delivery vehicle along the delivery route, determining where and how to park the delivery vehicle when arriving at a destination, fetching the correct packages to make a delivery, facilitating the delivery of a package, updating the status of the delivery to a delivery tracking network, and so forth.

Existing delivery guidance and assistance systems rely predominantly on mobile devices. However, such systems have many shortcomings, including poor battery life, a limited ability to convey important information on small mobile screens, and, more. In general, these systems place a greater-than-necessary cognitive load on delivery personnel to juggle the management of logistics-related mobile applications while simultaneously performing the delivery-related tasks, such as those described above. Improvements to such delivery guidance and assistance systems are, therefore, desirable.

Figure 1:
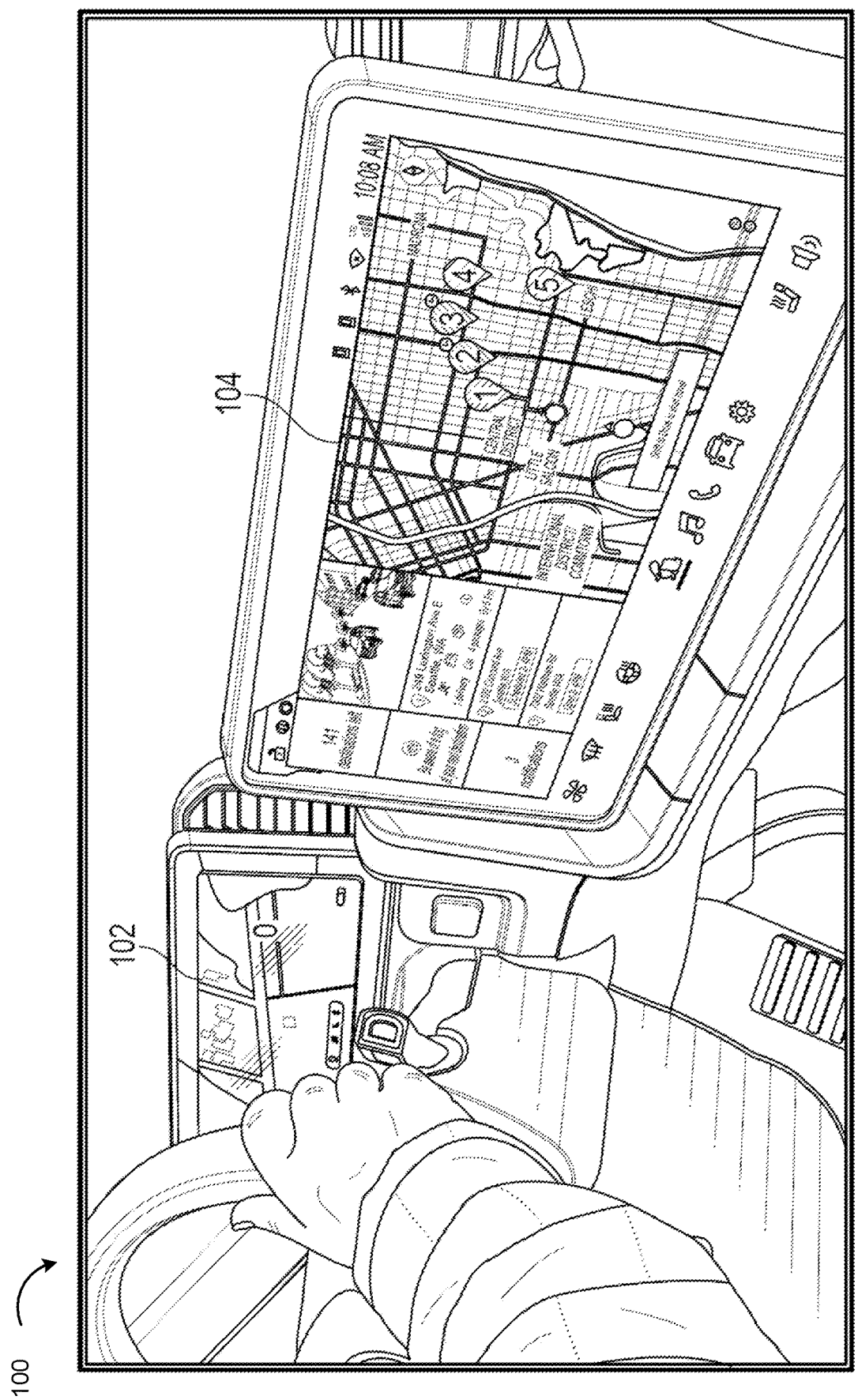
FIG. 1 illustrates an environment in which a multi-screen package delivery guidance and assistance system is implemented, in accordance with one or more example embodiments of the present disclosure.

Certain implementations will now be described more fully below with reference to the accompanying drawings, in which various implementations and/or aspects are shown. However, various aspects may be implemented in many different forms and should not be construed as limited to the implementations set forth herein; rather, these implementations are provided so that this disclosure will be thorough and complete, and will fully convey the scope of the disclosure to those skilled in the art. Like numbers in the figures refer to like elements throughout. Hence, if a feature is used across several drawings, the number used to identify the feature in the drawing where the feature first appeared will be used in later drawings.

DETAILED DESCRIPTION

Example embodiments described herein provide certain systems, methods, and devices for delivery guidance and assistance systems. "Last-mile delivery" refers to a logistics term used to describe the transportation of a package from a fulfillment center to the package's final destination. The goal of a last mile carrier is to deliver the item as quickly and cost-effectively as possible. Existing delivery guidance and assistance systems rely predominantly on mobile devices. However, such systems have many shortcomings, including poor battery life, a limited ability to convey important information on small mobile screens, and more. In general, these systems place a greater-than-necessary cognitive load on delivery personnel to juggle the management of logistics-related mobile applications while simultaneously performing the delivery-related tasks, such as those described above. Improvements to such delivery guidance and assistance systems is, therefore, desirable.

In various embodiments, a vehicle comprises one or more display units that may be used to present itinerary, navigation, and delivery information to a driver. A display unit may be implemented as a graphics display device in accordance with FIG. 10. The vehicle may include one or more sensors that may be used to collect vehicle data, such as the location of the vehicle, speed and acceleration information, safety information, such as whether the driver is seated and buckled in, when a door or trunk has been opened or closed, and so forth. The vehicle may include one or more processors that may be used to present delivery and/or navigation related information on the one or more displays units.

Figure 10:
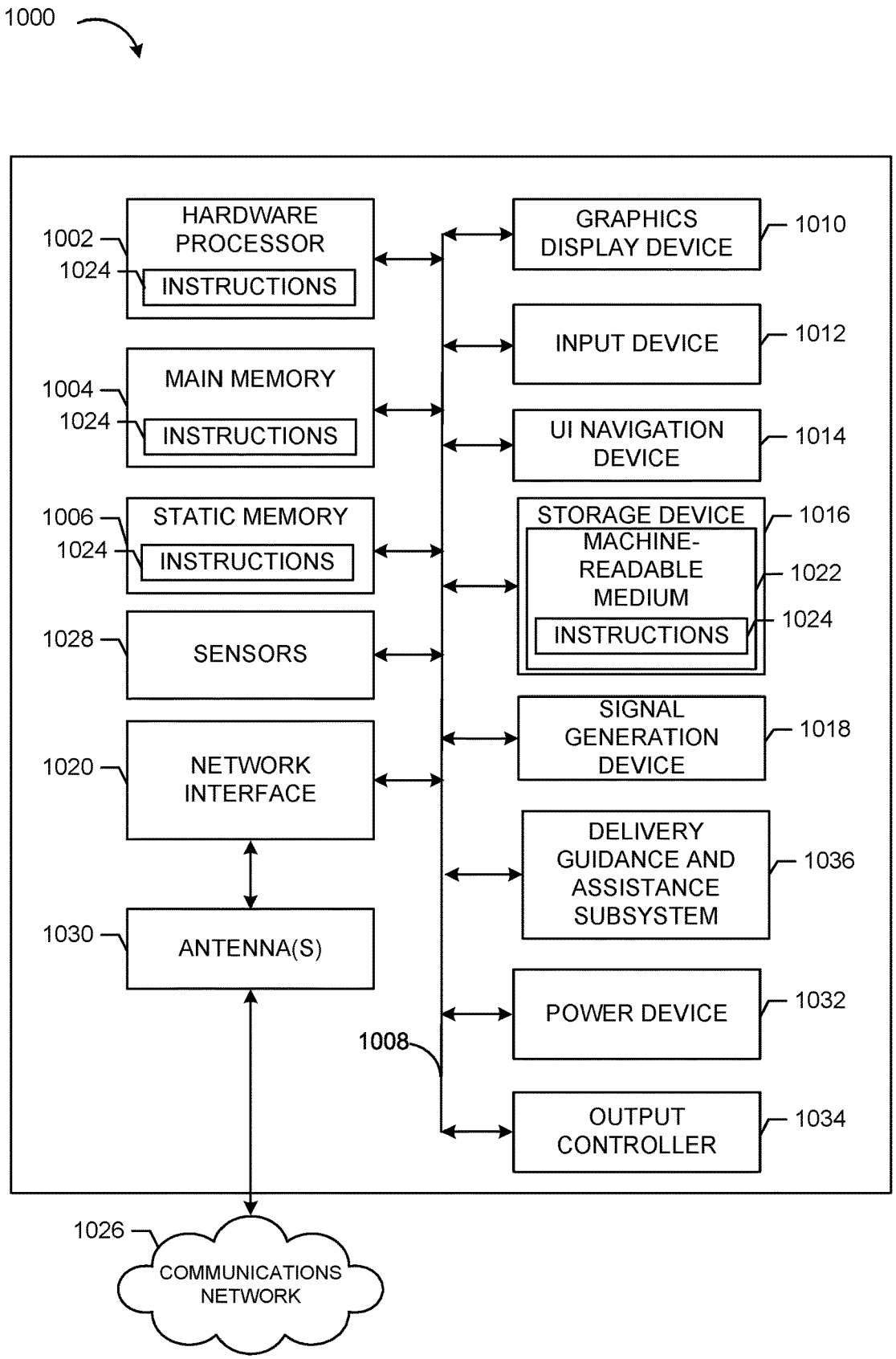
FIG. 10 illustrates a block diagram of an example machine upon which any of one or more techniques (e.g., methods) may be performed, in accordance with one or more example embodiments of the present disclosure.

According to various techniques described herein, different graphical user interfaces may be presented on one or more display units of a vehicle (e.g., implemented as a graphics display device in accordance with FIG. 10). These graphical user interfaces may be optimized or otherwise designed to assist in a driver's performance of different sub-tasks related to a delivery. Vehicle sensor data may be used to determine which sub-task is being performed, and a corresponding graphical interface that is optimized for performance of the current sub-task may be presented to the user. A graphical interface that is optimized for the performance of a task or sub-task may display or otherwise present information to the user that helps facilitate performance of the task, according to at least one embodiment of the present disclosure. For example, in a pre-driving state, the graphical interface may be optimized for the driver's planning of a delivery route by presenting information that is relevant to the planning of the delivery route. This may include presenting itinerary information in a list format that can be re-arranged, presenting display delivery notes, presenting a map UI with pins for some or all of the destinations and a proposed route, unlocking the map UI to allow for the driver to move the map UI to focus on and zoom into different delivery locations, and so forth. As a second example, in a driving or navigation state, the graphical interface may be optimized for the driver's navigation to a particular destination by presenting information that is relevant to the navigation to a destination. This may include presenting turn-by-turn directions at an instrument cluster (IC) screen that the driver can conveniently view while driving, present a map UI on a central information display (CID) screen in a track-up orientation to assist the driver in previewing what road conditions the driver may be approaching, locking the itinerary list to prevent the driver from accidentally re-arranging upcoming destinations, and collapsing the delivery notes or other information that is not needed while the driver is navigating to the destination.

As an example, when a delivery person gets into a vehicle and is getting ready to begin or resume a delivery route, a pre-driving graphical interface may be presented to the driver. The pre-driving interface may provide the driver with stop and route overview information that is optimized to aid the driver in preparing for upcoming deliveries. For example, the map may provide an A-to-B route in one view that shows the vehicle's current location, a proposed route to a destination, and the next stop after that, and the map may be locked such that the map UI will not move but the vehicle location icon will move when the driver interacts with the screen. In various embodiments, the pre-driving graphical interface will display the next one, next two, next three, etc. delivery locations, which may be helpful to the delivery person for the planning a group of deliveries.

Vehicle sensor data may be used to identify when the vehicle is in a pre-driving state. For example, when the delivery person opens the driver-side door, a sensor may detect that the door has been opened and/or closed, and such signals may be used to determine or infer that a delivery person is in a pre-driving state.

Vehicle sensor data may be used to determine when the delivery person and/or vehicle is no longer in a pre-driving state and transitions into a driving state. The determination may be programmatically made based on vehicle sensor data, for example, based on an engine ignition signal, based on the vehicle shifting from park to drive, based on vehicle movement, and so forth. These are non-limiting examples of how to determine that a vehicle is in a driving state.

When a vehicle enters a new state, the graphical interface displayed on one or more display screens may be updated so that a different graphical interface is presented. For example, when a vehicle is shifted from park to drive, that may signal a transition from a pre-driving state to a driving state, and a driving or navigation graphical interface may be presented. The driving or navigation interface may differ from the pre-driving interface in various respects. The driving graphical interface may be optimized for navigation of the vehicle to a destination (e.g., delivery location). For example, the driving graphical interface may provide stop and route overview and provide an updated, live vehicle location icon as the vehicle is travelling towards a destination. The driving graphical interface may display turn-by-turn directions on an instrument cluster (IC) screen if one is available or, alternatively, on a central information display (CID) screen if the vehicle does not have an IC screen. When in the driving state, a map of the graphical interface may be displayed in a track-up orientation that matches the direction that the vehicle is pointed.

Continuing with this example, when the vehicle approaches a delivery location, the vehicle may enter an arriving state. The arriving state may be triggered when the vehicle enters a geofence associated with the delivery location. In some embodiments, the vehicle enters an arriving state when the vehicle has completed the last turn-by-turn navigation instruction, has entered a geofence, has decreased to a speed below a threshold (e.g., under 10 miles per hour), using other vehicle signals, or any suitable combinations of the above. When the vehicle is in the arriving state, the graphical interface of the IC screen providing navigation information may continue to operate the same as in the driving state, but the CID screen may be updated to provide a close up view of the stop with situational information, such as the home address that the delivery is to be made, which side of the street the house is on, and so forth. In this arriving state, the CID map may be stationary or locked, but the vehicle location icon moves.

Vehicle sensor data may be used to determine when the vehicle has arrived at the destination and has parked. This may be determined based on the vehicle shifting into park, the engagement of hazard lights, the speedometer reaching zero, or other vehicle signals. Upon determining that the vehicle is parked, the CID screen may update to display a graphical interface that is associated with delivery of one or more packages. For example, the graphical interface may be updated to provide delivery details, which may include graphical information depicting a drop-off location for the delivery, text-based delivery instructions, or combinations thereof. Graphical information may include a picture of where a package should be dropped off at a location, such as an unloading dock at a business location. Text-based delivery information may include a passcode that may be needed to enter an apartment complex, or specific delivery instructions, such as to ring the doorbell when delivering the package, taking a picture of the package when delivery is made, information cautioning the delivery person that there are dogs on the premises, and so forth.

In various embodiments, another state transition occurs when the delivery person has arrived at the delivery destination, parks the vehicle, and then proceeds to fetch a package for delivery. A problem with existing delivery guidance and assistance systems is that a delivery person may be encumbered from searching for and locating a package for delivery when using a mobile device. In conventional solutions, a delivery person may be required to hold a mobile device in one hand which displays the information for a package to deliver—for example, information specifying a recipient, address, or serial number—and use the other hand to locate the package. This solution is cumbersome for the delivery person, and furthermore, the delivery person may need to periodically interact with the mobile device to prevent the mobile device from locking or shutting its screen off due to a timeout. Such solutions result in a poor package retrieval experience for delivery persons.

In various embodiments described herein, when a delivery person opens a trunk or cargo door, vehicle sensor data indicating that the delivery person is fetching a package may be relayed to the vehicle's processing system. The CID screen may be updated with a package retrieval graphical interface that is optimized to assist with retrieval of a package. For example, in many delivery vehicles, the CID screen is visible from the cargo or package storage area. Accordingly, the CID screen may be updated with a graphical interface that displays various retrieval-related information. For example, the graphical interface of the CID screen may be updated to show package identification information, such as an address, a description of the package (e.g., if it is a box or an envelope, the size, shape or color of the package, etc.). Additionally, the retrieval-related information may be displayed according to a lower content density than in other states. This may be to allow for larger text and/or graphics to be rendered, which may be visible from greater distances, as the intended viewing distance for package retrieval is farther from the screen than for driving and pre-driving states. By providing the package retrieval information in the CID screen, the delivery person now has a hands free package retrieval experience wherein he or she is able to use both hands to more quickly locate the package for delivery. The IC screen may be deactivated or turned off while the delivery person retrieves and delivers the package.

When the delivery person completes the delivery and returns to the vehicle, the vehicle may return to the pre-driving state, which is updated to account for the delivery of the package, and the pre-driving screen may then, as a result, display delivery preview information for the next package to be delivered.

Accordingly, the state of the art for package delivery guidance and assistance systems may be improved using techniques described herein that improve on technical aspects of package delivery. Conventional mobile devices require many manual interactions by delivery persons and utilize static user interfaces that are not optimized for use in the context of package delivery. In various embodiments described herein, vehicle data is collected from one or more sensors integrated in a delivery vehicle and deliveries are organized into sub-tasks. A sub-task being performed is determined based on vehicle sensor data, and a corresponding graphical interface optimized for performance of said sub-task is selected and presented to a user. Sensor data may be continuously collected and used to identify when one sub-task is completed and another commences, at which point a new graphical interface may be presented to aid in the performance of the next sub-task. By using such techniques, deliveries can be made safer and more efficient, and result in better user experience through the elimination of manual interactions that would otherwise have been necessary.

In at least one embodiment, a method for package delivery guidance and assistance comprises obtaining, at a mobile device, vehicle identification information for a delivery vehicle of a fleet of delivery vehicles, wherein the delivery vehicle comprises a plurality of sensors. The mobile device and delivery vehicle may perform a handshake process, wherein the handshake process comprises using the mobile device to scan a code that is unique to the delivery vehicle. Delivery information may be synchronized from the mobile device with the delivery vehicle. The vehicle's system may determine, from the delivery information, a delivery route comprising at least a first delivery. A first delivery task may be divided into several sub-tasks. The vehicle may be suitable for determining, based on first vehicle sensor data obtained from the plurality of sensors, that the delivery vehicle is in a pre-driving state. The vehicle may further select, based on the determination of the pre-driving state, a first graphical user interface optimized for presentation of the delivery route. The vehicle then presents, on at least one display of the delivery vehicle, the first graphical interface on one or more screens of the delivery vehicle.

Different graphical interfaces may be presented at different sub-tasks to facilitate performance of various activities. The vehicle may collect additional vehicle sensor data from the plurality of sensors. The vehicle may determine that the delivery vehicle has transitioned from a pre-driving state to a driving state. The vehicle then selects, based on the determination of the driving state, a second graphical user interface optimized for navigation of the delivery vehicle to a first geolocation for the first delivery and replaces the first graphical user interface with the second graphical user interface.

The vehicle may collect third vehicle sensor data from the plurality of sensors, determine, based on the third vehicle sensor data, that the delivery vehicle is in an arriving state. Upon determining the vehicle is in the arriving state, a third graphical interface optimized for facilitating the first delivery at the first geolocation may be selected, and the second graphical user interface may be replaced with the third graphical user interface.

The vehicle may continue to collect fourth vehicle sensor data from the plurality of sensors and determine, based on the fourth vehicle sensor data, that the delivery vehicle is in a delivery state. Upon such a determination, the vehicle may select, based on the determination of the delivery state, a fourth graphical interface optimized for identification of a first package to be delivered at the first geolocation; and replace the third graphical user interface with the fourth graphical user interface.

In various embodiments, the first vehicle sensor data comprises first data indicating that the delivery vehicle is shifted in a park position; the second vehicle sensor data comprises second data indicating that the delivery vehicle is shifted in a drive position; the third vehicle sensor data comprises third data, obtained from a global positioning system (GPS) of the delivery vehicle, indicating that the delivery vehicle is within a first geofence associated with the first geolocation; and the fourth vehicle sensor data comprises fourth data indicating that the delivery vehicle is shifted in the park position and within the first geofence.

In various embodiments, the method further comprises collecting fifth vehicle sensor data from the plurality of sensors indicating that the first package is being delivered and de-activating the at least one display in response to a timeout.

In various embodiments, the method further comprises synchronizing second delivery information from the mobile device with the delivery vehicle, the second delivery information associated with a first delivery status of the first package, updating the delivery route based on the second delivery information, collecting sixth vehicle sensor data from the plurality of sensors indicating that the delivery vehicle is in a pre-driving state, and in response to the sixth vehicle sensor data, re-activating the at least one display with the first graphical user interface.

The above descriptions are for purposes of illustration and are not meant to be limiting. Numerous other examples, configurations, processes, etc., may exist, some of which are described in greater detail below. Example embodiments will now be described with reference to the accompanying figures.

FIG. 1 illustrates an environment 100 in which a multi-screen package delivery guidance and assistance system is implemented, in accordance with one or more example embodiments of the present disclosure.

In at least one embodiment, a delivery vehicle comprises hardware that includes multiple display screens, such as screen 102 and screen 104 depicted in FIG. 1. As described throughout this disclosure, screen 102 may be referred to as an instrument cluster (IC) screen and screen 104 may be referred to as a central information display (CID) screen. Screens may be physically integrated into a vehicle such that they are not removable or not intended to be removable while in operation.

Different graphical interfaces with different layouts may be presented on screen 102 and/or screen 104 throughout different states or stages of a delivery, pickup, or other task that may be performed by a driver or other individual. For example, when a delivery person's initial user experience with a multi-screen package delivery guidance may involve the person opening a door of the vehicle and getting in. The package delivery guidance and assistance system may receive sensor data indicating that the door has been opened and use that signal to turn on screen 102 and/or screen 104 and to display a welcome message, a quick response (QR) code that encodes vehicle identification information, and so forth. A pre-driving graphical interface may be displayed to the user on screen 102 and/or screen 104 while the vehicle is parked. The pre-driving graphical interface may be used to present delivery route information and may be optimized for delivery planning.

Vehicle sensor data may be used to determine when the state or stage of delivery changes. For example, when a delivery person shifts the vehicle from park to drive, such data may be collected by a sensor and provided to the package delivery guidance and assistance system. This signal may be used to transition from a pre-driving or planning state to a driving or navigation state. The pre-driving graphical interface may be replaced by a driving or navigation graphical interface that is optimized for navigation to a destination. When the vehicle is approaching the destination—for example, when the vehicle enters a geofence associated with the destination—the graphical interface may change again to an arriving graphical interface that is optimized for assisting the driver to find a good place to park and to prepare for a delivery, pickup, or other task that is to be performed at the destination. Once the vehicle has parked, the graphical interface may be updated to display a different graphical interface layout that is optimized for package retrieval, for example, displaying information regarding the size or type of the package, address or recipient information, which bin or section of the cargo area of the vehicle to find the package, and so forth.

Graphical interfaces that are presented to the driver via screen 102 and/or screen 104 utilize vehicle sensor data, according to various embodiments. Drivers and delivery personnel may go through several hundred stops a day, and the automated updating of graphical interfaces in a vehicle to present relevant information at different states or stages of tasks to be performed can save the users hundreds of user interactions with electronic systems, which can provide for greater safety by reducing the need for human interaction with electronic systems at various points throughout a delivery. For example, a navigation user experience can be automated to begin providing turn-by-turn instructions in response to vehicle shifter signals. The next stop delivery details can be automatically presented in response to the vehicle shifting to park and recognizing that the vehicle is within a geofence and that the vehicle signal is stopped. Delivery notes can be automatically presented to the delivery person at that point of delivery and provide the driver with instructions on how to retrieve a package and make a delivery.

In various embodiments, screen 102 is physically integrated into a dashboard that is located in front of the steering wheel and may be used to present different instrumentation readings for a vehicle. Screen 102 may be implemented as a digital display screen, for example, a liquid crystal display (LCD) screen and may be used to display various vehicle driving related instrumentation readings, such as display speed, RPM, fuel/charge level, odometer, and other readings. In some embodiments, physical and digital instruments are used in combination with each other in a driver-side dashboard. The IC screen may, in addition to providing instrument readings, be used to display navigation-related information, such as the distance and/or estimated time to reach a destination, navigation instructions, and more. As an example, screen 102 may be used to provide turn-by-turn navigation information for a driver that provides instructions on how to reach a destination. The destination may be a location in which the driver is to deliver a package, pick up a package (e.g., customer returns a product), and so forth.

Electronic circuitry comprising one or more processors and memory may be used to implement functionality described in connection with a package delivery guidance and assistance system. For example, the vehicle may include processors, memory, wireless receivers and transmitters, and more that is used to render graphical and text-based information on screens 102 and 104, receive and process vehicle sensor data, receive and process delivery data, receive and process user inputs, and so forth.

In various embodiments, screen 104 is a central information display (CID) screen. CID screen may refer to a display screen that is integrated into the vehicle and may be located as electronics found in front of and/or between the driver and passenger. The CID screen may be implemented within an automotive head unit or infotainment system or other electronic systems that provide hardware and/or software interfaces for controlling various functionality integrated into a car. A head unit may be provide a user interface for the vehicle's information and entertainment media components including some or all of: AM/FM radio, satellite radio, DVDs/CDs, USB MP3, dashcams, GPS navigation, Bluetooth, Wi-Fi, and sometimes vehicle systems status. Moreover, it may provide control of audio functions including volume, band, frequency, speaker balance, speaker fade, bass, treble, equalization, and so on. In some embodiments, screen 104 may be implemented as a tablet, smartphone, or other mobile device that is paired with the vehicle.

In addition to having one or more display screens, a vehicle may also have sensors attached to the vehicle that measure various physical properties of the vehicle. Vehicle sensors may provide sensor data to a processing unit on a continuous basis. For example, the speed or velocity of the vehicle may be measured and displayed on screen 102 in a continuous manner so as to provide real-time information to a driver as to how fast the vehicle is being driven. Sensors may be attached to doors, trunks, seat belts, and other physical elements of a vehicle. Vehicle sensor data may be used to determine when a door is opened or closed, when the engine is turned on, when the car is shifted from drive to park or vice versa, and so on.

Figure 2:
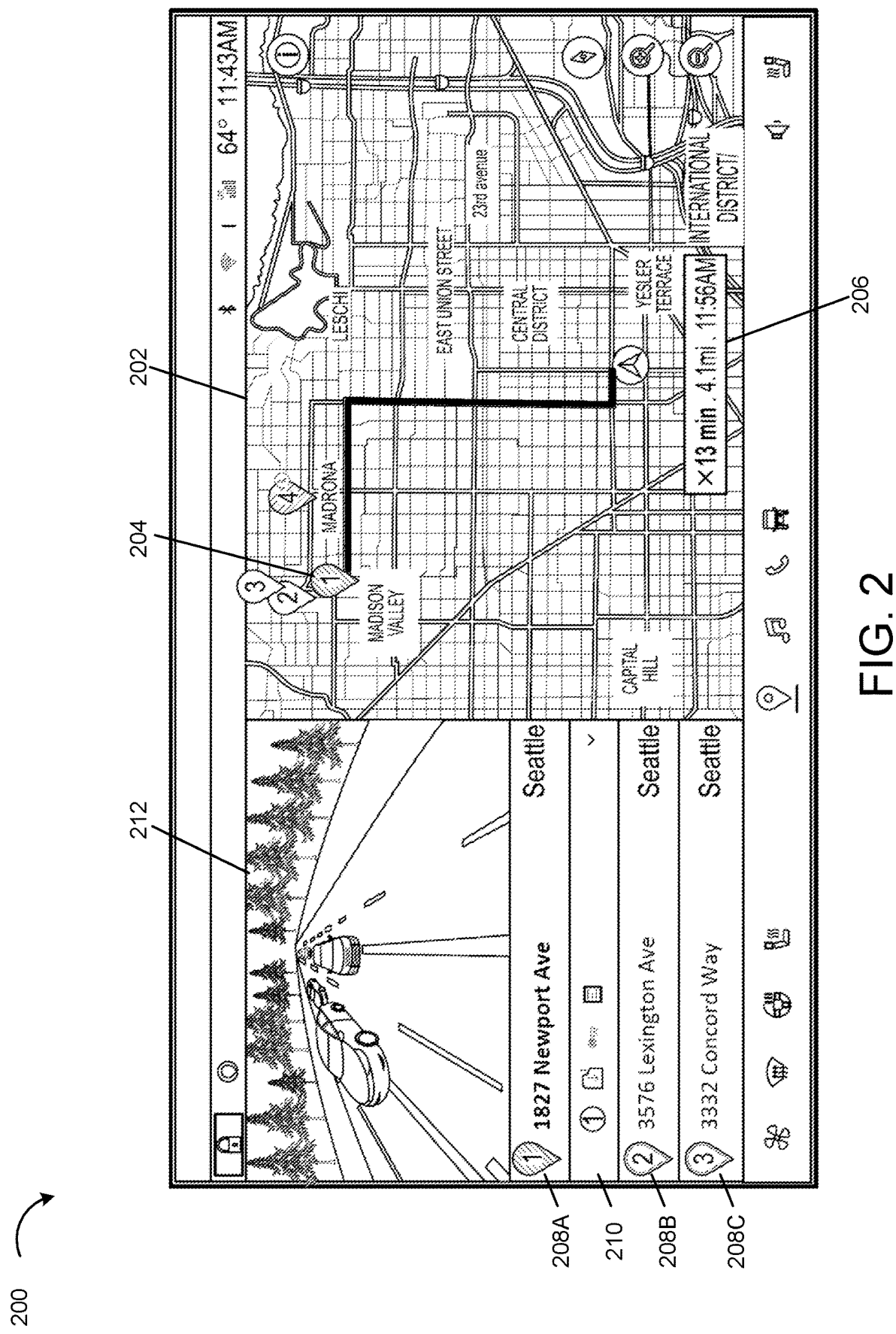
FIG. 2 illustrates a graphical interface associated with a driving state, in accordance with one or more example embodiments of the present disclosure.

FIG. 2 illustrates a graphical interface 200 associated with a driving state, in accordance with one or more example embodiments of the present disclosure.

Vehicle sensor data is used to determine the state of a vehicle and may be used to determine a suitable graphical interface to present to the user in the applicable state. For example, a task such as a delivery may be partitioned into a set of sub-tasks, and different graphical interfaces may be optimized for performance of different sub-tasks. As an illustrative example, graphical interface 200 may be presented on a CID screen of a multi-screen package delivery guidance and assistance system, such as those described in connection with FIG. 1.

Graphical interface 200 may be organized to aid in the performance of a particular sub-task. For example, in the context of a package delivery, one sub-task may involve the navigation of a delivery vehicle with a package to a destination where the package should be dropped off. Vehicle sensor data may be used to determine when a vehicle is shifted into drive, when the vehicle has reached a certain speed, left a loading facility, etc. and such signals may be used to determine that the driver of the vehicle is performing a driving sub-task. Graphical interface 200 may be presented in response to vehicle sensor data indicating that the driving sub-task is being performed.

Graphical interface 200 may be optimized to assist a user perform a sub-task. In this particular case, the graphical interface 200 may include a map 202 portion that includes navigation-related information that assists the driver in navigating to a delivery location. In a multi-screen system, graphical interface 200 may be displayed in the CID screen whereas turn-by-turn directions are provided to the user on a screen located in front of the driver, such as an IC screen or a transparent heads-up display (HUD).

Graphical interface 200 may be used to provide navigation information in a north-up orientation. North-up orientation refers to a map display in which the cardinal north direction always points "up" on the watch screen. Conversely, a track-up orientation rotates the map on the watch as the user's heading changes so that "up" on the screen matches the forward direction of travel and may be useful for navigation. The map 202 may include a pin 204 that indicates the next destination. In some embodiments, a cluster of destinations (e.g., pins 1-4 depicted in FIG. 2) are shown on map 202 to provide the user with more information regarding a delivery route. The additional pins may be helpful for users to identify whether making multiple deliveries in a single stop is viable. Map 202 may, furthermore, include estimates 206 of how long it will take to reach the destination, the distance to the destination, the expected arrival time, and so forth. It should be noted that graphical interface 200 may lack certain turn-by-turn information, which may be presented on a separate display screen if one is available. However, in other embodiments where only a single screen is available, the system may present turn-by-turn instructions in graphical interface 200. Map 202 may be in a locked view where the vehicle moves within map 202 but the map itself does not move.

Graphical interface 200 may further comprise an itinerary list, such as itinerary list item 208A, itinerary list item 208B, and itinerary list item 208C depicted in FIG. 2. The itinerary list region of the graphical interface may be a scrolling list that displays upcoming stops in the expected delivery sequence. In various embodiments, the order of the list items is locked while the user is in a driving state, and is unlocked in other states when not driving. For example, when the vehicle is in a pre-driving state, the itinerary list items 208A-C may be re-ordered in any suitable or desired manner by a tap-and-hold-and-drag touch gesture, but such re-ordering may be prohibited when the vehicle is in a driving state. This may be done to prevent the accidental re-ordering of stops while the vehicle is in motion.

Itinerary information such as itinerary list item 208A may include address information, neighborhood or city information, and may be presented to provide the user with a preview of the next stop or next several upcoming stops. The next stop may be highlighted in a different color, text, font type, font style, and so forth, so as to make the next stop more prominent. In FIG. 2, itinerary list item 208A is bolded, to indicate that the next stop is at 1827 Newport Ave. In various embodiments, one or more of the itinerary list items may have an additional collapsible details element 210. A user may tap on collapsible details element 210 to see additional information regarding the delivery stop, such as delivery notes or other information pertinent to a delivery, return, or other task. As shown, collapsible details element 210 shows some summary information before being expanded to show additional information. For instance, as shown the leftmost icon represents the destination number, the next icon represents the delivery of a single package, as denoted by the package with a down arrow (e.g., as opposed to an up arrow which may be used to denote a package pick-up or package being returned) and the number of packages in the upper-right region of the icon, the next icon represents there is an access restriction at this address and the next icon represents delivery notes for this address. In some embodiments, these icons are only displayed when they are applicable, e.g., if there is no access restriction then the access restriction icon will not be present. This way, the driver can prepare for upcoming conditions without being overloaded with information until it is needed. The delivery information may, by default, be collapsed in the driving state's graphical interface as such information may be considered irrelevant to navigation. The collapsible details element may be expanded by a user tapping on the element. In some embodiments, collapsible details element 210 is automatically expanded in the arriving state—for example, as discussed in connection with FIG. 3. Itinerary list items may be implemented in accordance with embodiments described in connection with FIG. 5.

Graphical interface 200 may comprise a camera view 212. The camera view 212 may provide a video feed from one or more sensors located around the vehicle. For example, while the vehicle is driving straight forward, a rear view camera may be presented to provide the driver with a convenient view of what is behind him or her. In some embodiments, side view cameras will be engaged when the vehicle's left or right turn blinkers are engaged, or when left or right turn motion is sensed.

Figure 3:
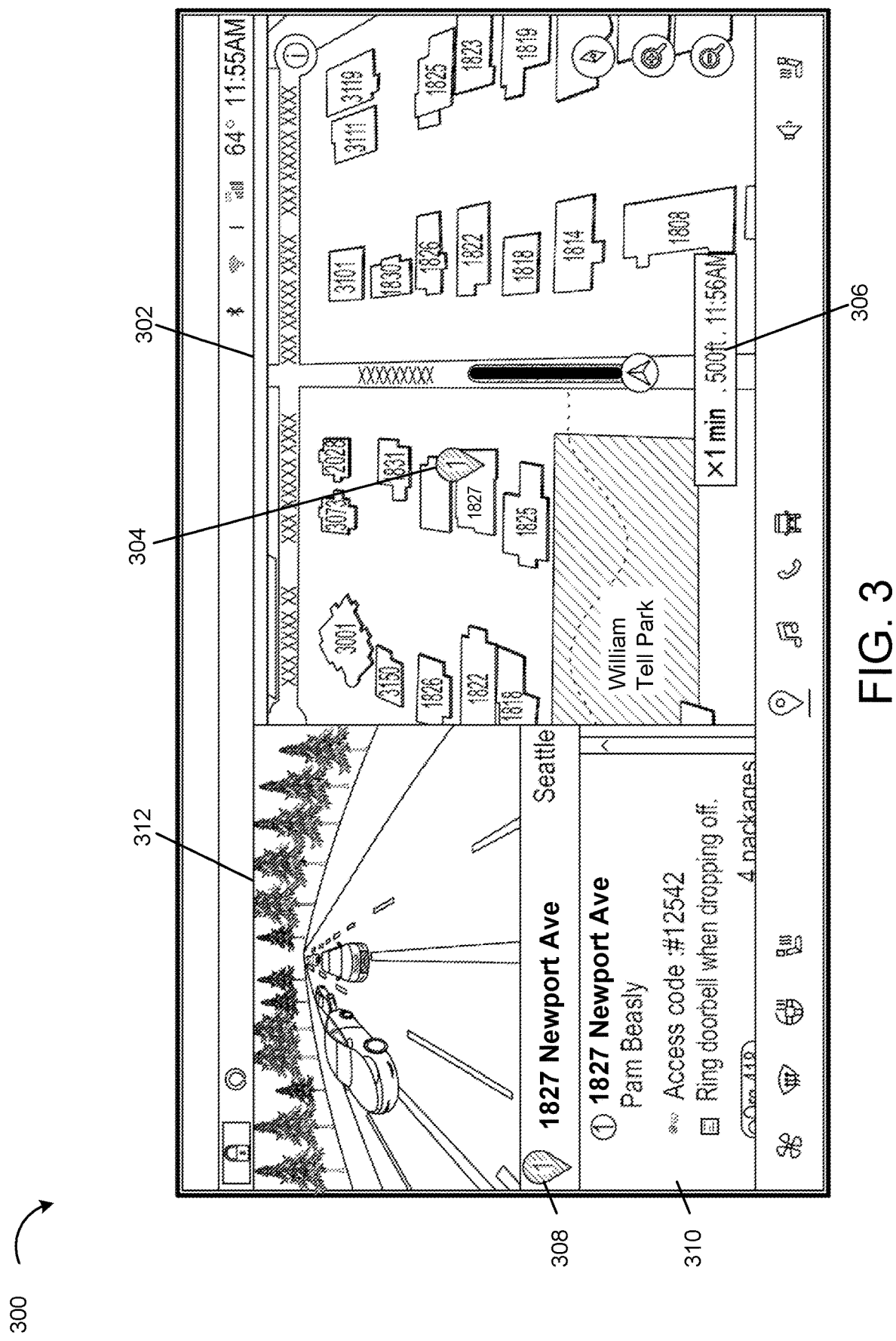
FIG. 3 illustrates a graphical interface associated with an arriving state, in accordance with one or more example embodiments of the present disclosure.

FIG. 3 illustrates a graphical interface 300 associated with an arriving state, in accordance with one or more example embodiments of the present disclosure.

When an arriving state is detected, graphical interface 300 may be presented on a screen, such as CID screen described in connection with FIG. 1. The graphical interface 300 may be presented and replace a different graphical interface that was used in the previous state (e.g., graphical interface described in connection with FIG. 2 is replaced by graphical interface 300).

In various embodiments, a delivery vehicle may transition from a driving state to an arriving state in response to vehicle sensor data. For example, one of the vehicle sensors may include a GPS receiver, which is used to determine the global position of the vehicle. A geofence may be generated around a destination. A geofence may be determined for a delivery address based on third party data sources, manual input sources, and/or learned using machine learning algorithms that learn from past successful and/or failed deliveries as inputs. A geofence maps an area centered around a delivery location to denote the correct location. A geofence may be circular with a radius that is between 25 meters and 500 meters around a delivery address. The radius may be determined based on the type of address (e.g., a unit or house may have a smaller radius while an apartment complex may have a larger radius). When the vehicle enters the geofence, the arriving state may be initiated. In some embodiments, other information, such as the speed of the car decreasing below a threshold, the vehicle completing the last turn-by-turn instruction, etc. may be used to determine a transition from a driving state to an arriving state.

Map 302 may be presented in graphical interface 300 to assist the driver in locating the destination. In various embodiments, map 302 is a track-up orientation to allow for the user to more easily orient the driver's view with the contents of map. For example, the driver may more easily determine that the destination at pin 304 is located on the driver's left-hand side using a track-up orientation as opposed to a north-up orientation. Map 302 may include estimates 306 of how long it will take to reach the destination, the distance to the destination, the expected arrival time, and so forth. In some embodiments, the estimate 306 may provide additional information useful for determining a suitable arrival location, such as a recommendation to a suitable parking location near the destination, landmark cues for the destination, such as "Destination On Your Left, After William Tell Park" and so forth. In various embodiments, itinerary information 308 is displayed in graphical interface 300. The graphical interface 300 may include stop information for a single delivery, as opposed to a list of all deliveries for a delivery route. In various embodiments, stop information is displayed only for a set of stops that are nearby the destination at pin 304. The stop information may be customizable by the driver so that the driver may see the stop information for several stops if he or she wishes to make multiple deliveries at one stop.

In various embodiments, expanded details element 310 is presented in graphical interface 300. In various embodiments, expanded details element 310 includes details regarding how a delivery should be made. Expanded details element 310 can include specific delivery instructions, such as to ring the doorbell when delivering the package, an access code for opening a locked door or gate, information cautioning the delivery person that there are dogs on the premises, and so forth. Expanded details element 310 may be automatically presented in graphical interface 300, whereas such information is, by default, hidden in other graphical interfaces associated with other sub-tasks or states.

Graphical interface 300 may comprise an arriving view 312. The arriving view 312 may provide a video feed from one or more sensors located around the vehicle. For example, while the vehicle is driving straight forward, a rear view camera may be presented to provide the driver with a convenient view of what is behind him or her. In some embodiments, side view cameras will be engaged when the vehicle's left or right turn blinkers are engaged, or when left or right turn motion is sensed. In some embodiments, arriving view may be a static image of the destination. In some embodiments, a video camera on the vehicle may determine the location of the vehicle, the location of the destination, and aim the camera lens towards the destination to provide a live video feed of the destination as the driver is approaching the destination.

Figure 4:
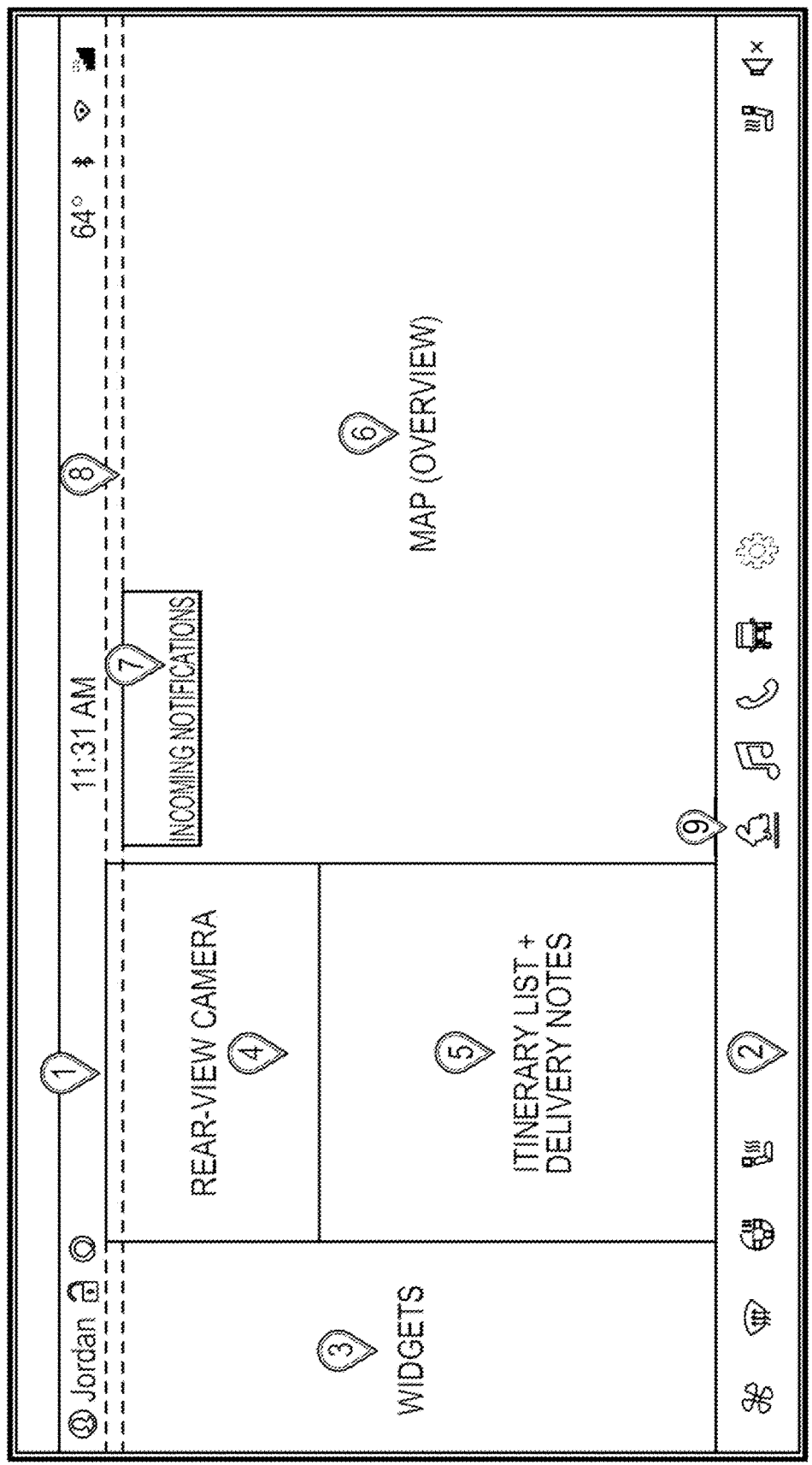
FIG. 4 illustrates a graphical interface template, in accordance with one or more example embodiments of the present disclosure.

FIG. 4 illustrates a graphical interface template 400, in accordance with one or more example embodiments of the present disclosure.

Graphical interface template 400 shown in FIG. 4 may be a customizable template that can be used to define different types of graphical interfaces that may be presented to users at various points in the performance of a delivery, pickup, or other tasks.

In various embodiments, graphical interface template 400 may include a top menu region, indicated as balloon 1 in FIG. 4. The top menu may include information such as a user profile, the current time, temperature, battery, connectivity information, and more. The information in the top menu may be customizable based on application and/or operating system settings. In at least one embodiment, graphical interface template 400 depicts a template that may be used for a pre-driving graphical interface. Various graphical interfaces described throughout this disclosure may be implemented using techniques described in connection with FIG. 4.

In various embodiments, graphical template 400 may include a bottom menu region, indicated as balloon 2 in FIG. 4. The bottom menu region may include various touchscreen interface elements representing different functionality that a user can control. For example, if a graphical interface is implemented at least in part using an infotainment screen, the bottom menu region of the graphical interface may include virtual buttons for climate control settings, heated seat settings, music settings, hands free phone call settings, volume settings, and more. In some embodiments, an icon in the bottom menu may be presented to allow the user to launch the package delivery guidance and assistance system. For example, the icon indicated by balloon 9 may be used to launch a package delivery guidance and assistance application.

In various embodiments, graphical template 400 may include a widgets region, indicated as balloon 3 in FIG. 4. Widget may refer to extensible graphical elements that may be defined or otherwise provided by third-parties or provide a region of the graphical interface that can provide additional context sensitive information. For example, a widget can be used to provide information about how many deliveries have been made or how many are left. For example, the widget may display text information "7 of 16 deliveries completed" or "25 packages remaining to be delivered" and so forth. A widget may be used to provide graphical or text-based information indicating whether the delivery person is on track or behind schedule. A widget may be used to present third-party delivery information associated with a delivery. Data indicative of the third-party delivery information may be received by the system. Important information can be push to the widget so driver knows the next stop is a delivery to an address with a dog alert so as to give the driver safety preparation. Other third parties or the safety team can utilize the widget and build their information into one of the widgets that is not directly in the itinerary but additional information that can be context sensitive.

In various embodiments, graphical template 400 may include a rear-view camera region, indicated as balloon 4 in FIG. 4. The review-view camera regions depicted in FIG. 4 may be a portion of the graphical interface that depicts a video feed that is captured by a rear-view camera. In some embodiments, a side-view camera view is be engaged when the vehicle's left or right turn blinkers are engaged, or when left or right turn motion is sensed. In some embodiments, a static image view may be shown in the camera region, for example, when a driver is arriving at a destination, an image of the destination or drop-off location may be shown in the graphical interview to aid the driver in locating the precise location of the destination.

In various embodiments, graphical template 400 may include an itinerary list and delivery notes region, indicated as balloon 5 in FIG. 4. The itinerary list and delivery notes region may be used to present itinerary list items to the user. The itinerary list region of the graphical interface may be a scrolling list that displays upcoming stops in the expected delivery sequence. In various embodiments, the order of the list items is locked while the user is in a driving state, and is unlocked in other states when not driving. For example, when the vehicle is in a pre-driving state, the itinerary list items may be re-ordered in any suitable or desired manner by a tap-and-hold-and-drag touch gesture, but such re-ordering may be prohibited when the vehicle is in a driving state. This may be done to prevent the accidental re-ordering of stops while the vehicle is in motion.

Itinerary information such as itinerary list items may include address information, neighborhood or city information, and may be presented to provide the user with a preview of the next stop or next several upcoming stops. The next stop may be highlighted in a different color, text, font type, font style, and so forth, so as to make the next stop more prominent. In various embodiments, one or more of the itinerary list items may have additional delivery notes. A user may tap on a collapsible details element to see delivery notes regarding the delivery stop, such as information pertinent to a delivery, return, or other task. The delivery notes may, by default, be collapsed in the driving state's graphical interface as such information may be considered irrelevant to navigation. The delivery notes may be viewed by tapping on an expandable element. In some embodiments, collapsible details elements are automatically expanded in the arriving state—for example, as discussed in connection with FIG. 3. Itinerary list items may be implemented in accordance with embodiments described in connection with FIG. 5.

In various embodiments, graphical template 400 may include a map region, indicated as balloon 6 in FIG. 4. The map region may be configured to present different map views in different templates. For example, the map region may be defined to be north-up in some templates and track-up in other templates. North-up orientation refers to a map display in which the cardinal north direction always points "up" on the watch screen. Conversely, a track-up orientation rotates the map on the watch as the user's heading changes so that "up" on the screen matches the forward direction of travel and may be useful for navigation. In some embodiments, the map region can be centered on the vehicle or may allow for free movement of the map.

In various embodiments, graphical template 400 may include a notifications region, indicated as balloon 7 in FIG. 4. In various embodiments, notifications are surfaced above the map region and can be pushed to the system presenting a graphical interface from a service. In various embodiments, notifications can be suppressed while driving, or can be overlaid on top of the map region if they are pertinent to the next delivery stop. For example, if there is a road closure or unexpected change in traffic conditions, a notification may be presented with a recommendation to calculate a new route to the destination.

In various embodiments, graphical template 400 may include a divider region, represented by balloon 8.

Figure 5:
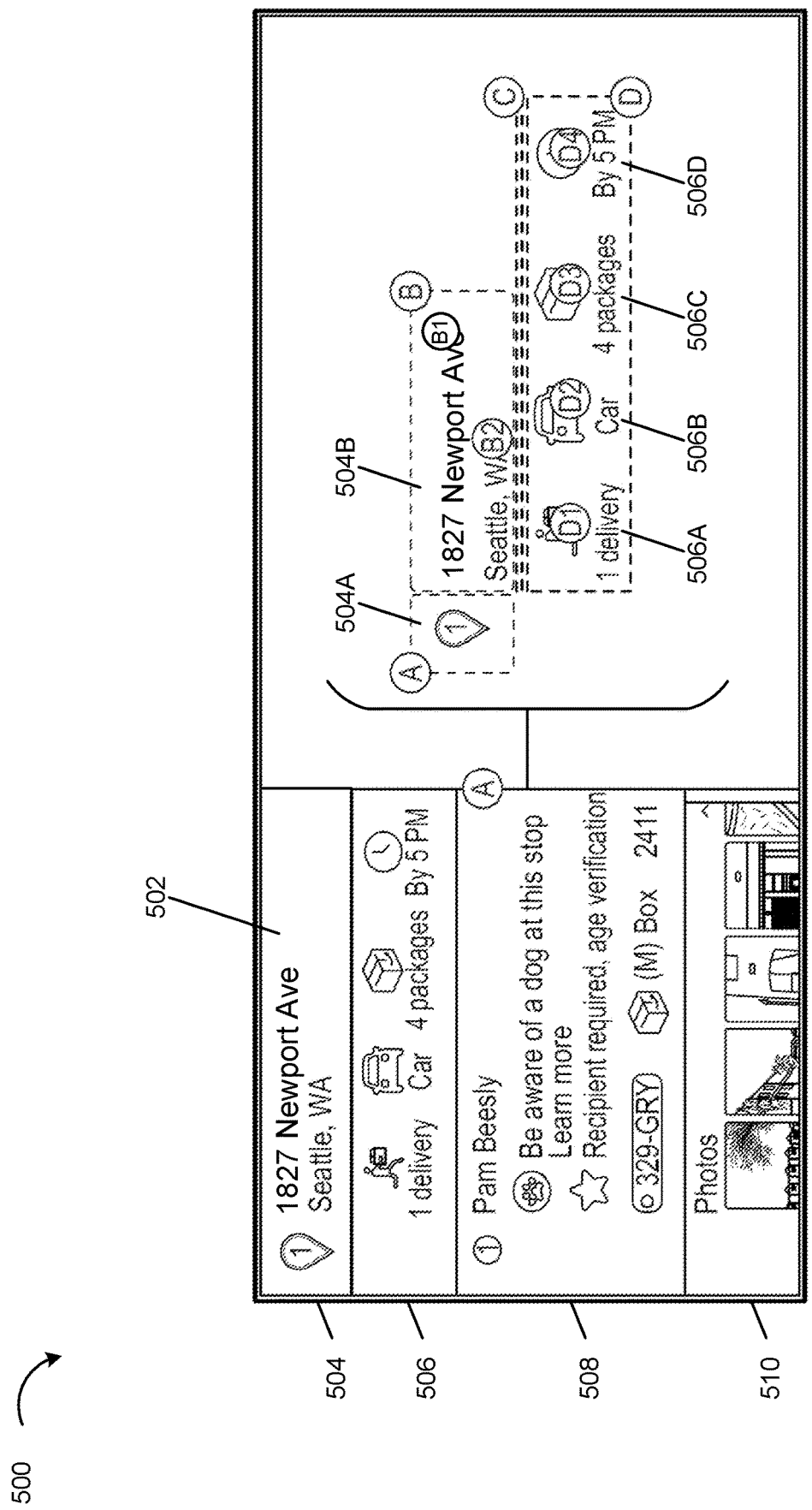
FIG. 5 illustrates an environment in which an implementation of an itinerary list item is depicted, in accordance with one or more example embodiments of the present disclosure. Itinerary list items may be used to display package delivery information.

FIG. 5 illustrates an environment 500 in which an implementation of an itinerary list item is depicted, in accordance with one or more example embodiments of the present disclosure. Itinerary list items may be used to display package delivery information. For example, delivery information may be synchronized from a mobile device with a delivery vehicle and displayed as itinerary list items on a display screen of the vehicle.

An illustrative itinerary list item 502 is shown in the left-hand portion of FIG. 5. The list item may be one itinerary list item among several list items, for example, on a delivery route. In various embodiments, an itinerary list item comprises address information region 504, delivery overview information region 506, delivery notes region 508, and photos region 510. Other suitable configurations of itinerary list items may be implemented according to other embodiments.

Address information region 504 may be used to present information related to the destination and/or address. Delivery overview information may display text and/or icons that provide an overview to the delivery person regarding high-level delivery information, such as how many deliveries to perform, the number of packages, when the delivery should be made, and so forth. This information may be standardized information that is expected to be available for some or all tasks. The delivery notes region may include additional details that are specific to a delivery. For example, a passcode to enter a gated community may be provided in the delivery notes area. Other examples of delivery notes may include information cautioning the delivery person that there are dogs at or near the stop, that a recipient or signature confirmation is needed, that age verification is needed, and so forth. A photo region 510 may provide images of the destination and aid the driver in locating the particular destination for the itinerary item.

Turning now to the right-hand portion of FIG. 5, address information region 504 may be used to display various address related information. For example, address information region 504 may comprise a destination number 504A may indicate the stop order. For example "1" may represent the next stop, "2" may represent the stop after that, and so on and so forth. Address information region 504 may comprise address information (denoted as region "B" on the right-hand portion of FIG. 5). The address information may include street name, building number, unit number, etc. (region "B1") and/or city and state information (region "B2") which may be locale or country specific. For example, in the United States, state information may be displayed and in Canada, province information may be displayed, and so forth. Region C may denote a divider component. Region D may include delivery or task related information. Region D1 may refer to a task and number of tasks. Different types of tasks may include, for example, deliveries, pick-ups (e.g., of returned items), refills, work orders, and so forth. Region D2 may refer to a task type. This may be optional, only one task may be shown when the task type is not a default or standard task type. Region D3 may refer to the number of packages to be delivered. This may be optional and may be shown when such data is available. Region D4 may refer to a time window for delivery. This may be optional and shown when there is a scheduled delivery or pickup time, or a commercial operation window.

Figure 6A:
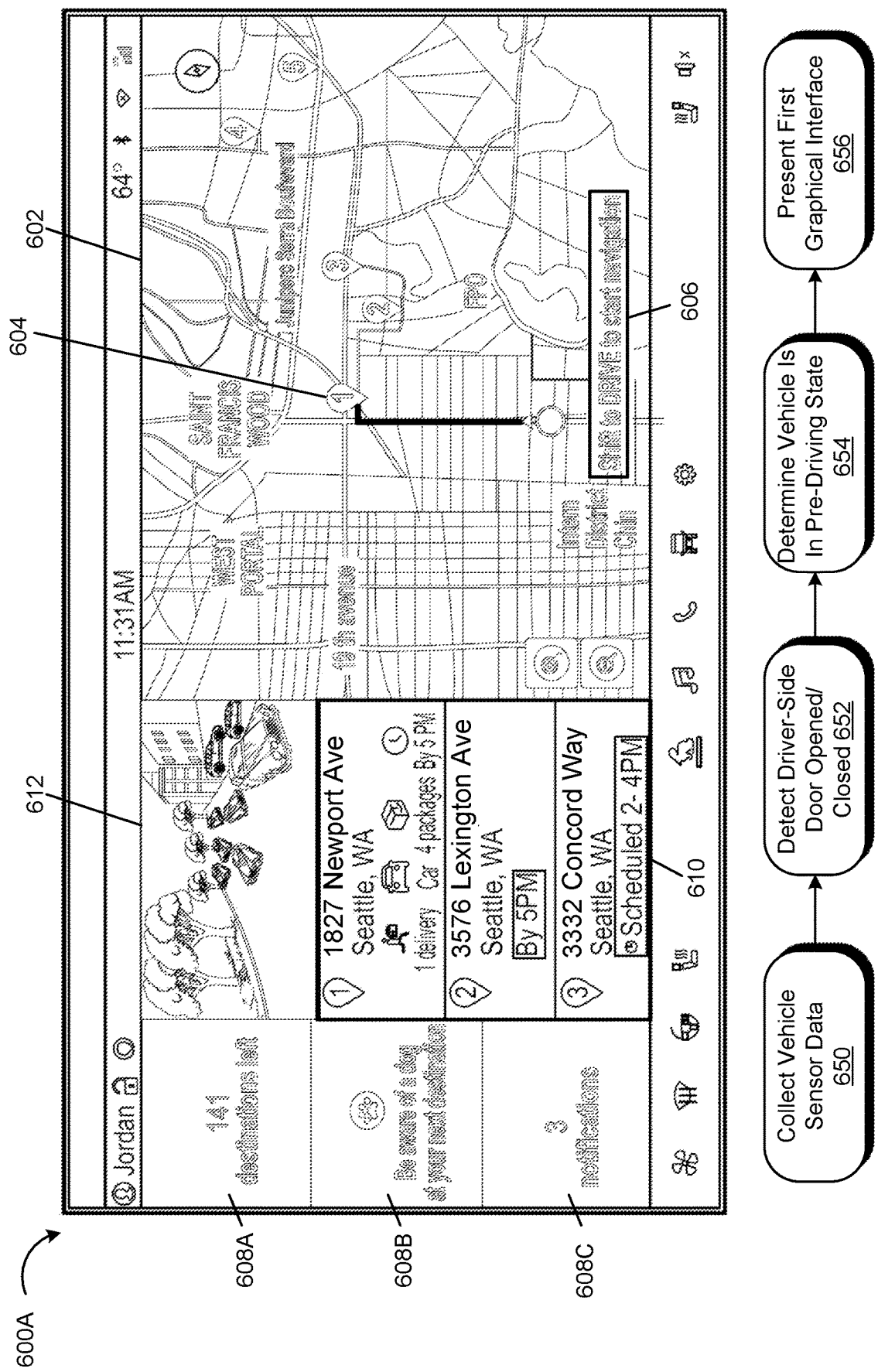
FIG. 6A depicts an illustrative pre-driving graphical interface, in accordance with one or more example embodiments of the present disclosure.

FIG. 6A illustrates a pre-driving graphical interface 600A, in accordance with one or more example embodiments of the present disclosure.

In various embodiments, a task, such as a package delivery, is organized into a series of sub-tasks. Vehicle sensor data may be used to determine the present state of a vehicle, which may be used to determine which sub-task is currently being performed. For example, vehicle sensor data may be used to determine when a user is parked, which may be associated with a pre-driving state. In various embodiments, when the vehicle has been shifted from park to drive, it indicates that the vehicle is in a driving state. In various embodiments, when the vehicle is approaching a destination, it is in an arriving state. In various embodiments, when the vehicle is parked at the destination, it is in a package retrieval or delivery state.

In at least one embodiment, a package delivery guidance and assistance system may determine the current state of a vehicle. The states for a delivery may include: pre-driving state; driving or navigation state; arriving state; package retrieval state; package delivery state; or suitable variations thereof. Sub-tasks may be associated with each state. For example, pre-driving state may involve a sub-task related to planning that involves identifying a suitable delivery route, determining whether deliveries to multiple destinations can be performed in a single stop, and so forth. While a delivery task is described in connection with FIGS. 6A-D, other types of tasks, such as, pick-ups (e.g., of returned items), refills, work orders, and more are contemplated in the scope of this disclosure.

In at least one embodiment, a vehicle comprises multiple sensors located throughout the vehicle. The sensors may include sensors that determine when doors, hatches, locks, or other physical elements of the car are interacted with. In various embodiments, vehicle sensor data is collected at step 650. The vehicle sensor data may be continuously collected and provided to a package delivery guidance and assistance system integrated into the vehicle.

In various embodiments, a vehicle sensor data is used to detect events, such as when a delivery person opens and/or closes a door at step 652. Other vehicle sensor data may be collected, such as whether a seat belt is engaged, whether a person is seated, whether a touchscreen of the vehicle was interacted with, and so forth.

Vehicle sensor data may be used at step 654 to determine that the vehicle is in a pre-driving state. Different states may be defined based on tasks or sub-tasks that are to be performed in connection with the vehicle. For example, if the task is to deliver packages, the driver may receive routing information to a fulfillment center where packages to be delivered can be received and loaded onto the vehicle. Various vehicle sensor information may be used to make the determination that the vehicle is in a pre-driving state, such as when the engine is turned on, when the driver-side seat belt is engaged, and so on.

Once a current state is determined, a corresponding first graphical interface may be selected. For example, different graphical interfaces may be defined for pre-driving state and driving state. The pre-driving graphical interface may be selected. Accordingly, at step 656, a first graphical interface for the pre-driving state may be presented on one or more display screens of a vehicle.

FIG. 6A depicts an illustrative pre-driving graphical interface, according to at least one embodiment. Pre-driving interface 600A may comprise various elements, including a map region 602, a destination pin 604, an instruction prompt 606, widgets 608A, 608B, and 608C, an itinerary list region 610, and a camera region 612.

Map region 602 may present stop and route overview information. A driver may have the option to group together multiple destinations into a single stop, for example, Map region 602 may provide an A-B route in a view. In various embodiments, map region 602 is fixed in a north-up orientation as opposed to a track-up orientation. The map UI won't move but location icon on the map may move in the pre-driving graphical interface. Pin 604 may indicate the first destination for a delivery route. In various embodiments, the driver is able to click on pin 604 to see more details regarding the delivery. Instruction prompt 606 may include information that assist with the pre-driving task. For example, the prompt may display "Shift to DRIVE to start navigation" as depicted in FIG. 6A. The driver may shift to drive, which proceeds to the next stage of the delivery.

Widgets such as widget 608A, 608B, and 608C may be presented in the pre-driving graphical interface. Widget may refer to extensible graphical elements that may be defined or otherwise provided by third-parties or provide a region of the graphical interface that can provide additional context sensitive information. For example, a widget can be used to provide information about how many deliveries have been made or how many are left. For example, the widget may "141 destinations left" "Be aware of a dog at your next destination" "3 notifications" and so forth. A widget may be used to provide graphical or text-based information indicating whether the delivery person is on track or behind schedule. Important information can be push to the widget so driver knows the next stop is a delivery to an address with a dog alert so as to give the driver safety preparation. Other third parties or the safety team can utilize the widget and build their information into one of the widgets that is not directly in the itinerary but additional information that can be context sensitive.

Graphical interface 600A may further comprise an itinerary list 610 as depicted in FIG. 6A. The itinerary list region of the graphical interface may be a scrolling list that displays upcoming stops in the expected delivery sequence. In various embodiments, the order of the list items is locked while the user is in a driving state, and is unlocked in other states when not driving. For example, when the vehicle is in a pre-driving state, the itinerary list item may be re-ordered in any suitable or desired manner by a tap-and-hold-and-drag touch gesture, but such re-ordering may be prohibited when the vehicle is in a driving state. This may be done to prevent the accidental re-ordering of stops while the vehicle is in motion.

In various embodiments, graphical interface 600A comprises a camera region 612. The camera regions depicted in FIG. 6A may be a portion of the graphical interface that depicts a video feed that is captured by a rear-view camera. In some embodiments, a side-view camera view is be engaged when the vehicle's left or right turn blinkers are engaged, or when left or right turn motion is sensed. In some embodiments, a static image view may be shown in the camera region, for example, when a driver is arriving at a destination, an image of the destination or drop-off location may be shown in the graphical interview to aid the driver in locating the precise location of the destination.

Figure 6B:
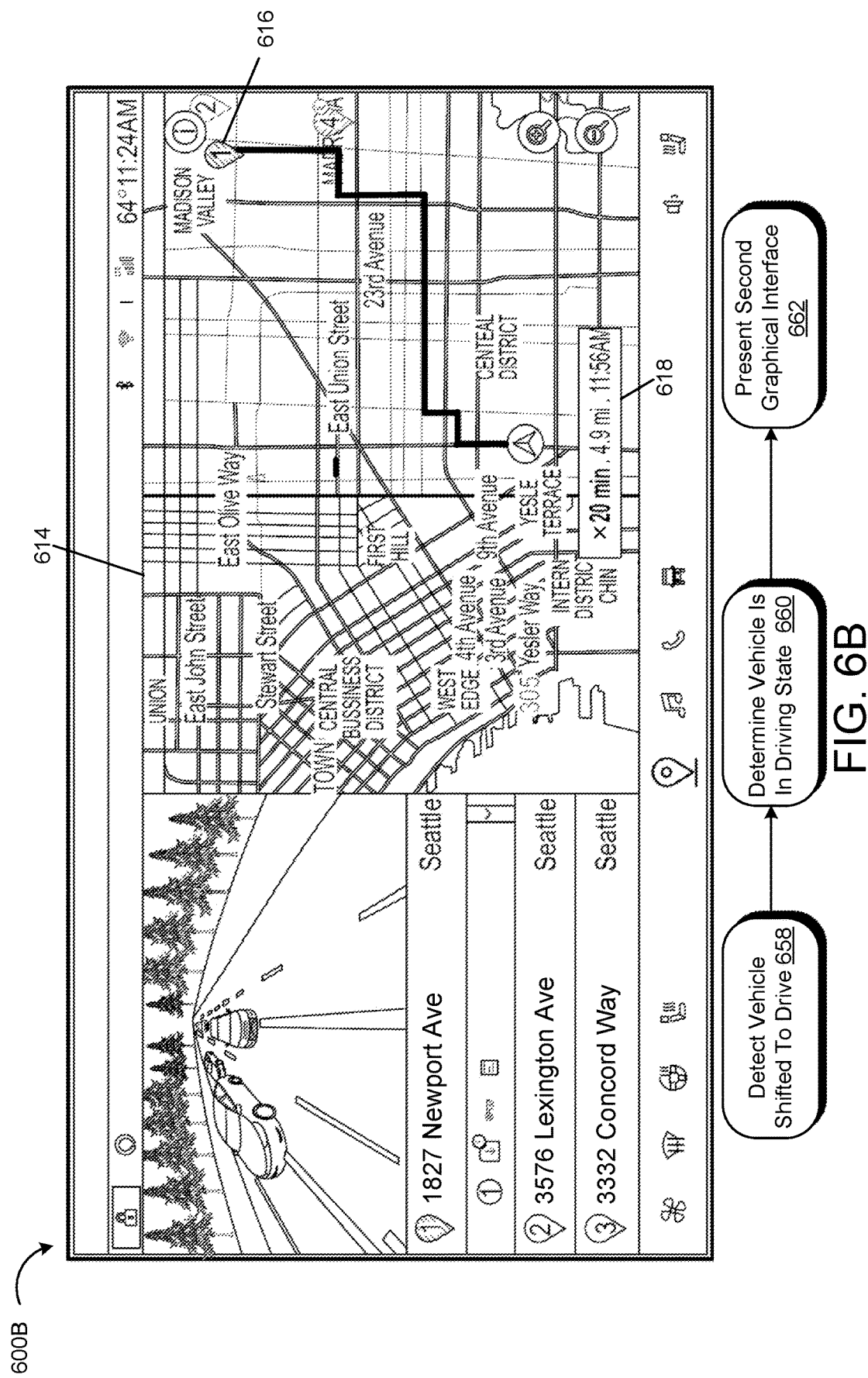
FIG. 6B depicts an illustrative driving graphical interface, in accordance with one or more example embodiments of the present disclosure.

FIG. 6B depicts an illustrative driving graphical interface, according to at least one embodiment. Driving interface 600B may comprise various elements, including a map region 614, a destination pin 616, an instruction prompt 606, widgets 608A, 608B, and 608C, an itinerary list region 610, and a camera region 612.

In at least one embodiment, a vehicle comprises multiple sensors located throughout the vehicle. The sensors may include sensors that determine when doors, hatches, locks, or other physical elements of the car are interacted with. In various embodiments, vehicle sensor data is collected. The vehicle sensor data may be continuously collected and provided to a package delivery guidance and assistance system integrated to the vehicle.

In various embodiments, vehicle sensor data is used to detect events, such as when a vehicle is shifted to drive at step 658. This sensor data may be used to determine that the vehicle is in a driving state at step 660. Other vehicle sensor data may be collected, such as when the speed of the vehicle exceeds a threshold or when the vehicle has departed a geofence.

Once an updated state is determined, a corresponding second graphical interface may be selected. For example, different graphical interfaces may be defined for pre-driving state and driving state. The driving graphical interface may be selected based on the vehicle being determined to be in a driving state. Accordingly, at step 662, a second graphical interface for the driving state may be presented on one or more display screens of a vehicle.

A driving graphical interface 600B may be used to provide navigation information in a track-up orientation. A track-up orientation rotates the map on the watch as the user's heading changes so that "up" on the screen matches the forward direction of travel and may be useful for navigation. The map region 614 may include a pin 616 that indicates the next destination. In some embodiments, a cluster of destinations is shown on map region 614 to provide the user with more information regarding a delivery route. The additional pins may be helpful for users to identify whether making multiple deliveries in a single stop is viable. Map region 614 may, furthermore, include estimates 618 of how long it will take to reach the destination, the distance to the destination, the expected arrival time, and so forth. It should be noted that graphical interface 600B may lack certain turn-by-turn information, which may be presented on a separate display screen if one is available. However, in other embodiments where only a single screen is available, the system may present turn-by-turn instructions in graphical interface 600B. Map region 614 may be in a locked view where the vehicle moves within map 614 but the map itself does not move.

Figure 6C:
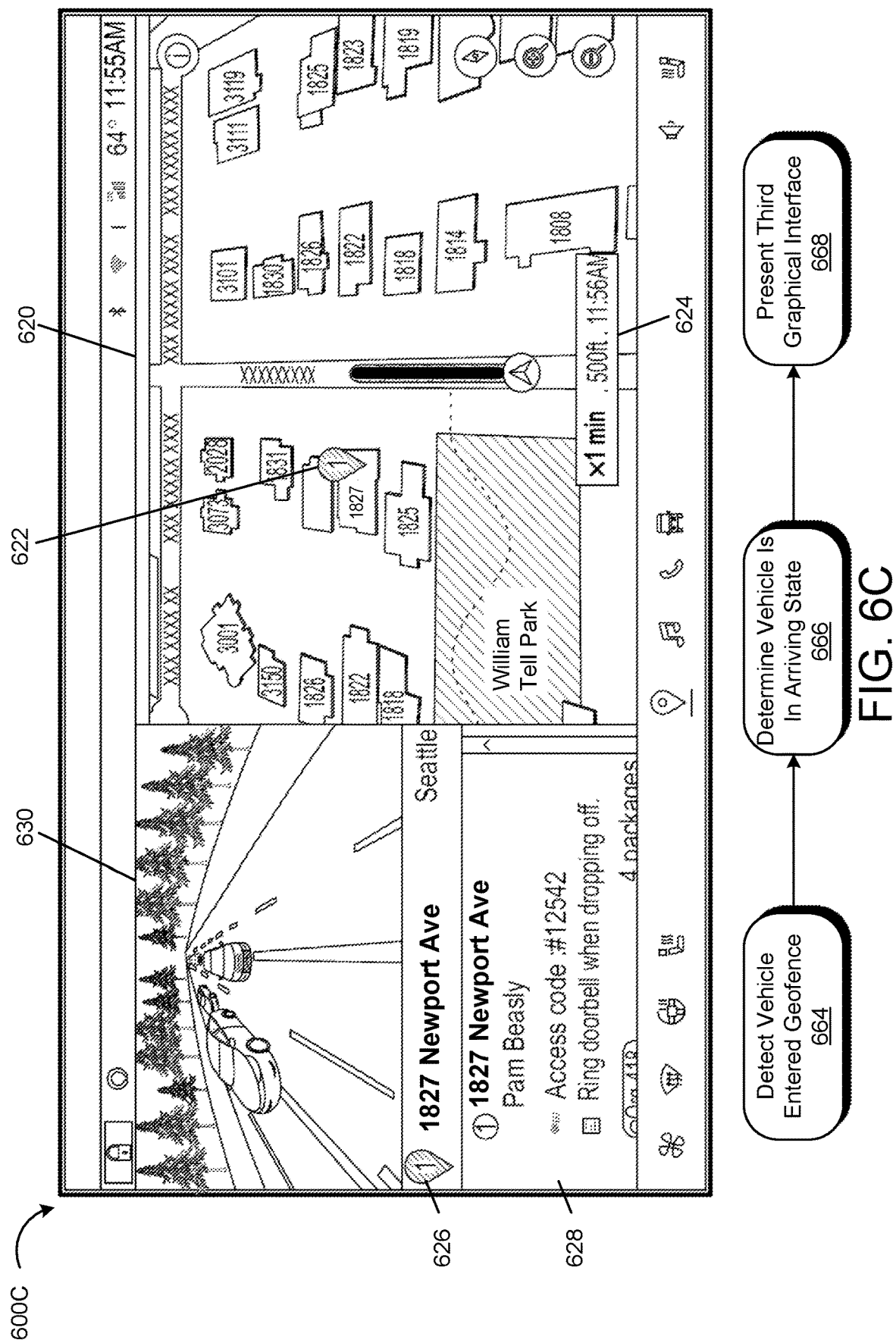
FIG. 6C depicts an illustrative arriving graphical interface, in accordance with one or more example embodiments of the present disclosure.

FIG. 6C depicts an illustrative arriving graphical interface 600C, according to at least one embodiment. Arriving interface 600C may comprise various elements, including a map region 620, a destination pin 622, estimate 624, itinerary information region 626, delivery notes region 628, and a camera region 630.

In at least one embodiment, a vehicle comprises multiple sensors located throughout the vehicle. The sensors may include sensors that determine when doors, hatches, locks, or other physical elements of the car are interacted with. In various embodiments, vehicle sensor data is collected. The vehicle sensor data may be continuously collected and provided to a package delivery guidance and assistance system integrated to the vehicle.

In various embodiments, vehicle sensor data is used to detect events, such as when a vehicle enters a geofence at step 664. This sensor data may be used to determine that the vehicle is in a driving state at step 666. Other vehicle sensor data may be collected to determine that the vehicle is in an arriving state. For example, the arriving state may be triggered based on the vehicle completing the last turn-by-turn instruction, the vehicle's speed decreasing below a threshold, or other suitable vehicle sensor signals.

Once an updated state is determined, a corresponding third graphical interface may be selected. For example, different graphical interfaces may be defined for the driving state and arriving state. The arriving graphical interface may be selected based on the vehicle being determined to be in an arriving state. Accordingly, at step 668, a third graphical interface for the arriving state may be presented on one or more display screens of a vehicle.

When an arriving state is detected, graphical interface 600C may be presented on a screen of the vehicle, such as CID screen described in connection with FIG. 1. The graphical interface 600C may be presented and replace a different graphical interface that was used in the previous state (e.g., graphical interface 600B is replaced by graphical interface 600C).

In various embodiments, a delivery vehicle may transition from a driving state to an arriving state in response to vehicle sensor data. For example, one of the vehicle sensors may include a GPS receiver, which is used to determine the global position of the vehicle. A geofence may be generated around a destination. When the vehicle enters the geofence, the arriving state may be initiated. In some embodiments, other information, such as the speed of the car decreasing below a threshold, the vehicle completing the last turn-by-turn instruction, etc. may be used to determine a transition from a driving state to an arriving state.

Map region 620 may be presented in graphical interface 600C to assist the driver in locating the destination. In various embodiments, map region 620 is a track-up orientation to allow for the user to more easily orient the driver's view with the contents of map. For example, the driver may more easily determine that the destination at pin 622 is located on the driver's left-hand side using a track-up orientation as opposed to a north-up orientation. Map region 620 may include estimates 624 of how long it will take to reach the destination, the distance to the destination, the expected arrival time, and so forth. In some embodiments, the estimate 624 may provide additional information useful for determining a suitable arrival location, such as a recommendation to a suitable parking location near the destination, landmark cues for the destination, such as "Destination On Your Left, After William Tell Park" and so forth. In various embodiments, itinerary information region 626 is displayed in graphical interface 600C. The graphical interface 600C may include stop information for a single delivery, as opposed to a list of all deliveries for a delivery route. In various embodiments, stop information is displayed only for a set of stops that are nearby the destination at pin 622. The stop information may be customizable by the driver so that the driver may see the stop information for several stops if he or she wishes to make multiple deliveries at one stop.

In various embodiments, delivery details of region 628 are presented in graphical interface 600C. In various embodiments, delivery details region 628 is an expandable/collapsible UI element that includes details regarding how a delivery should be made. Delivery details region 628 can include specific delivery instructions, such as to ring the doorbell when delivering the package, an access code for opening a locked door or gate, information cautioning the delivery person that there are dogs on the premises, and so forth. Delivery details region 628 may be automatically presented in graphical interface 600C, whereas such information is, by default, hidden in the driving graphical interface 600B.

Graphical interface 600C may comprise a camera region 630. The camera region 630 may provide a video feed from one or more sensors located around the vehicle. For example, while the vehicle is driving straight forward, a rear view camera may be presented to provide the driver with a convenient view of what is behind him or her. In some embodiments, side view cameras will be engaged when the vehicle's left or right turn blinkers are engaged, or when left or right turn motion is sensed. In some embodiments, arriving view may be a static image of the destination. In some embodiments, a video camera on the vehicle may determine the location of the vehicle, the location of the destination, and aim the camera lens towards the destination to provide a live video feed of the destination as the driver is approaching the destination.

Figure 6D:
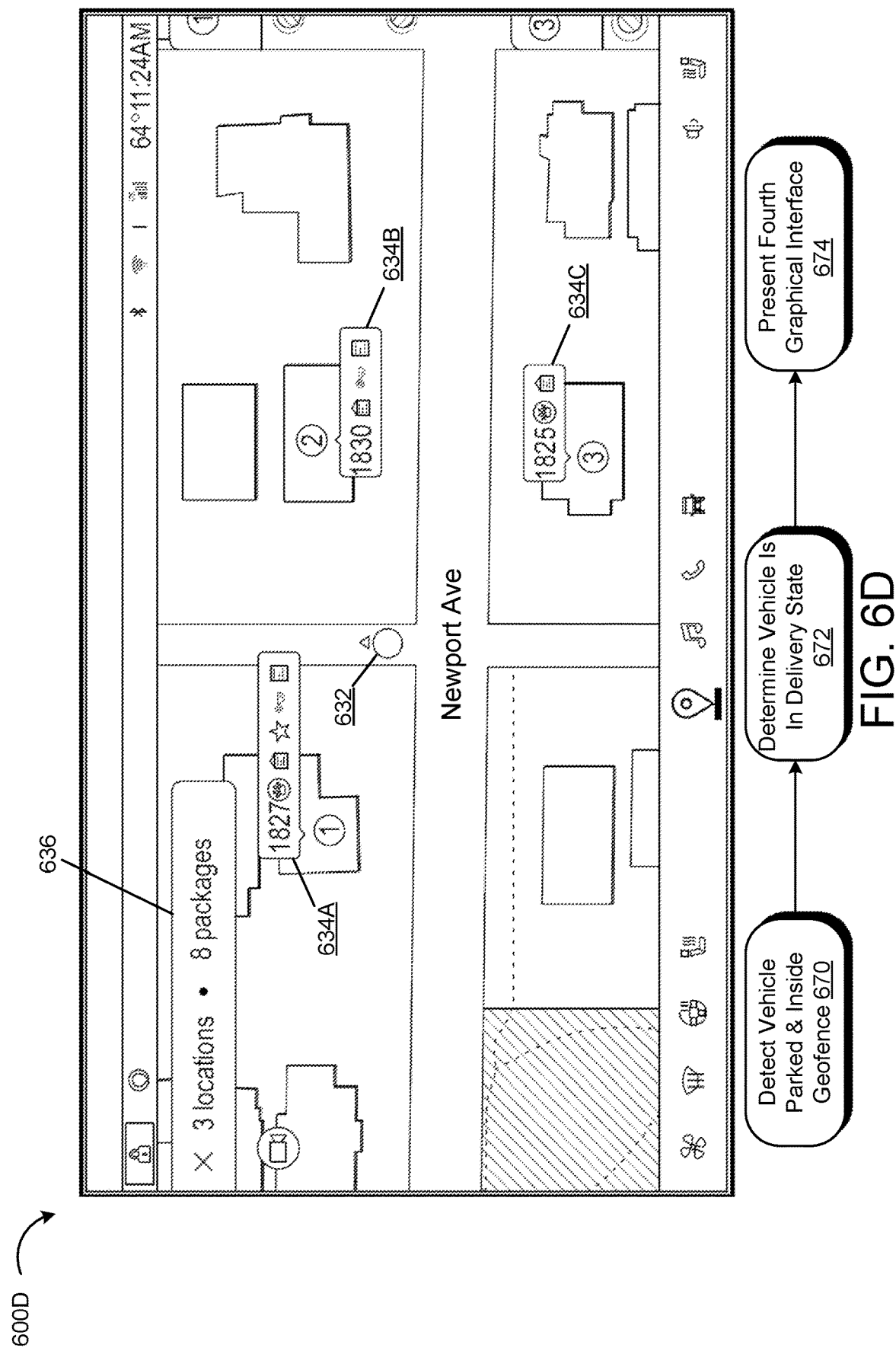
FIG. 6D depicts an illustrative arrived (location card) graphical interface, in accordance with one or more example embodiments of the present disclosure.

FIG. 6D depicts an illustrative a delivery planning graphical interface 600D, according to at least one embodiment. Graphical interface 600D may comprise various elements, including a map region depicting a pin 632 with the vehicle's current location 632, one or more delivery destinations (e.g., destinations 634A-C), and package delivery preview information 636.

In at least one embodiment, a vehicle comprises multiple sensors located throughout the vehicle. The sensors may include sensors that determine when doors, hatches, locks, or other physical elements of the car are interacted with. In various embodiments, vehicle sensor data is collected. The vehicle sensor data may be continuously collected and provided to a package delivery guidance and assistance system integrated to the vehicle.

In various embodiments, vehicle sensor data is used to detect events, such as when a vehicle is parked and also within a geofence at step 664. The geofence may be centered around a destination, such as one of the destinations depicted in FIG. 6D, or a location derived thereof, such as a centroid, incenter, orthocenter, or other suitable geometric center computed from a plurality of three or more destination locations for a delivery stop. This sensor data may be used to determine when a vehicle is shifted into park at step and a GPS receiver may be used to determine the location of the vehicle relative to one or more destinations. Other vehicle sensor data may be collected to determine that the vehicle is in a delivery state at step 672. For example, the delivering state may be triggered based on the vehicle engine being turned off, the opening and/or closing of a delivery person's door, motion data, or other suitable vehicle sensor signals for determining that a delivery is being initiated.

Once an updated state is determined, a corresponding fourth graphical interface may be selected at step 674. For example, different graphical interfaces may be defined for the arriving state and delivery state. The delivery graphical interface may be selected based on the vehicle being determined to be in a delivery state. The graphical interface of the delivery state may present a pin 632 indicating the position of a vehicle relative to its surroundings as well as an indicator (e.g., triangle or arrow) pointing in the direction that the vehicle is facing. In various embodiments, the map is unlocked so that the driver can tap and drag the map to explore the surroundings. This may be in contrast to the driving and navigation interfaces where the map is in a locked position, according to at least some embodiments. In various embodiments, in the delivery state, one or more destinations for a delivery stop are highlighted and presented to the user. In various embodiments, graphical interface 600D further comprises an itinerary list where one or more destinations for the delivery stop have delivery details expanded to allow for the delivery person to see information regarding each delivery without having the manually tap on each.

FIG. 6D depicts a non-limiting, illustrative example in which there are three delivery destinations 634A-C in a delivery stop. Delivery destination 634A may have a set of preview icons that depict delivery aspects, such as whether an access code is needed, information regarding pets and notices regarding the delivery environment, whether a recipient is required, whether signature verification is required, and so forth. Likewise, a different set of delivery icons may be relevant to delivery destination 634B and yet another different set of delivery icons may be relevant to delivery destination 634C. A delivery preview 636 may be displayed summarizing aggregate information for the entire delivery stop, such as the total number of deliveries associated with the delivery stop, the number of packages to deliver, and so forth.

Figure 6E:
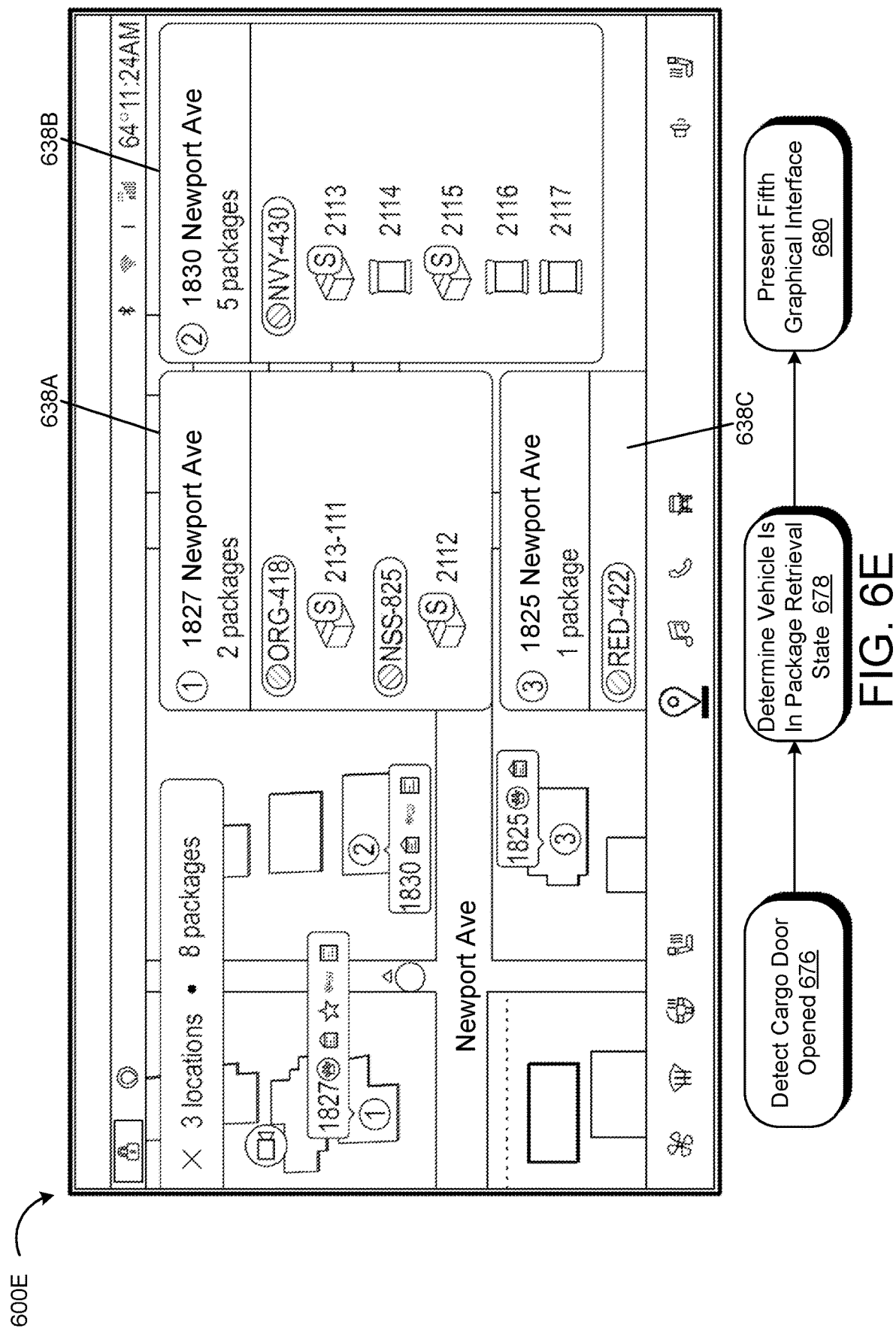
FIG. 6E depicts an illustrative arrived (package retrieval card) graphical interface, in accordance with one or more example embodiments of the present disclosure.

FIG. 6E depicts an illustrative delivery or package retrieval graphical interface 600E, according to at least one embodiment. Delivery or package retrieval graphical interface 600E may comprise various elements, including a package retrieval cards.

In various embodiments, vehicle sensor data is collected and used to determine when a graphical interface for package retrieval should be displayed. In various embodiments, a delivery vehicle has one or more screens that are visible from a cargo area in which packages can be stored. In some cases, the CID may be such a screen. In other cases, a cargo area of a van has a dedicated display screen where package information may be displayed and is located in a convenient area for a delivery person to inspect while retrieving one or more packages for a delivery stop. In various embodiments, at step 676, vehicle sensor data is collected and used to determine that a cargo door has been opened. In some embodiments, the state of a trunk, door, etc. that leads to a package storage area is monitored. In step 678, the vehicle signal data may be processed to determine that the vehicle is in a package retrieval state. The package retrieval state may be determined based on the delivery vehicle being parked/stationary and also being within a geofence for a delivery stop. In various embodiments, at step 680, in response to the determination that the vehicle is in a package retrieval state, a fifth graphical interface such as graphical interface 600E is presented on a display screen of the vehicle. The display screen may be a CID screen or other display screen that is conveniently visible to a user while retrieving packages.

Graphical interface 600E depicts a suitable graphical interface for package retrieval and/or delivery, according to at least one embodiment. Aspects of graphical interface 600E may include package retrieval cards such as cards 638A, 638B, and 638C depicted in FIG. 6. Cards may be displayed for each itinerary list item that is part of a current stop, which may be determined during a pre-driving state—for example, by a user selecting a group of one or more destinations to include in a delivery stop. FIG. 6E depicts an illustrative, non-limiting example in which a stop includes three deliveries, and the deliveries are made to addresses 1827, 1830, and 1825 in the same stop. Package retrieval cards may include various information regarding the packages to retrieve and/or deliver. For example, card 638A includes a summary of the number of packages to deliver to the first destination and information regarding the packages to retrieve. Such package retrieval information may include an identifier for the package, which may be printed or otherwise externally visible on the package, and an icon indicating the type of package (e.g., a small box, an envelope, etc.). Card 638B likewise depicts five packages for delivery to the second destination which includes two small boxes and three envelope packages. In some embodiments, cards for all destinations in a delivery stop are simultaneously presented. In some embodiments, card 638C is partially presented and a user can tap on card 638C to surface the details of the delivery at the third destination.

In various embodiments, graphical interface 600E is presented on a display that can be seen by a user from a cargo area of the delivery vehicle. Additionally, the package retrieval information (e.g., shown in cards 638A-C) may be displayed according to a lower content density than in other states. This may be to allow for larger text and/or graphics to be rendered, which may be visible from greater distances, as the intended viewing distance for package retrieval is farther from the screen than for driving and pre-driving states. By providing the package retrieval information in a lower content density, the delivery person now has a hands free package retrieval experience wherein he or she is able to use both hands to more quickly locate the package for delivery. The display screen may be deactivated or turned off while the delivery person retrieves and delivers the package.

In at least one embodiment, a vehicle comprises multiple sensors located throughout the vehicle. The sensors may include sensors that determine when doors, hatches, locks, or other physical elements of the car are interacted with. In various embodiments, vehicle sensor data is collected. The vehicle sensor data may be continuously collected and provided to a package delivery guidance and assistance system integrated into the vehicle.

In various embodiments, vehicle sensor data is used to detect events, such as when a vehicle is shifted to park. As noted in step 670, additional sensor information may be collected, such as when a driver or passenger side door is opened or closed, or that a cargo bay door has been opened or closed. These signals and other suitable vehicle signals may be used to determine that the delivery person is performing a package retrieval sub-task. This sensor data may be used to determine that the vehicle is in a package retrieval state at step 672. Other vehicle sensor data may be collected to determine that the vehicle is in an arriving state.

Once an updated state is determined, a corresponding fourth graphical interface may be selected. For example, different graphical interfaces may be defined for the package retrieval state and arriving state. The package retrieval graphical interface may be selected based on the vehicle being determined to be in a package retrieval state. Accordingly, at step 674, a fifth graphical interface for the package retrieval state may be presented on one or more display screens of a vehicle.

Figure 7A:
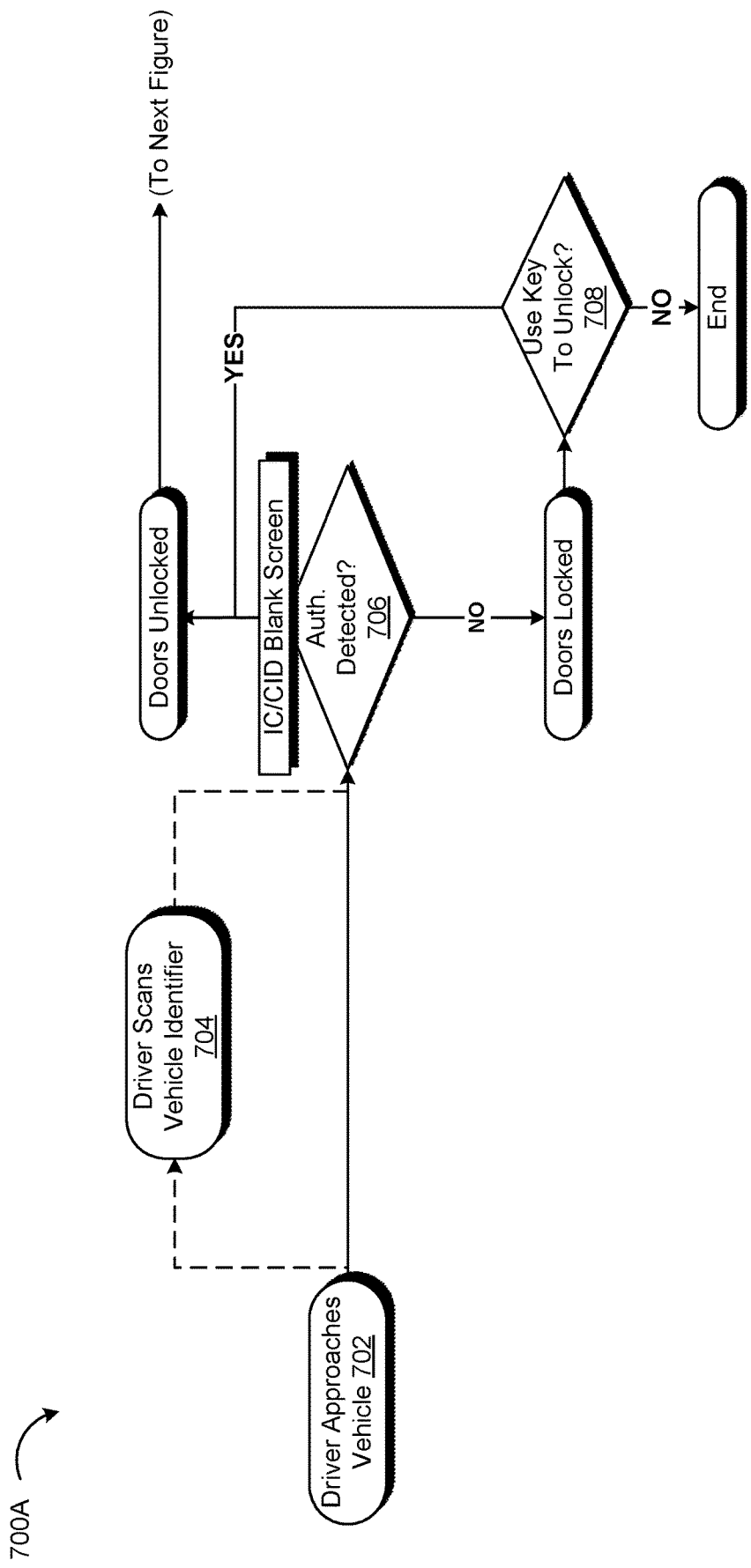
FIGS. 7A-C shows an illustrative example of a process for an initialization workflow for a delivery guidance and assistance system, in accordance with one or more example embodiments of the present disclosure.
Figure 7B:
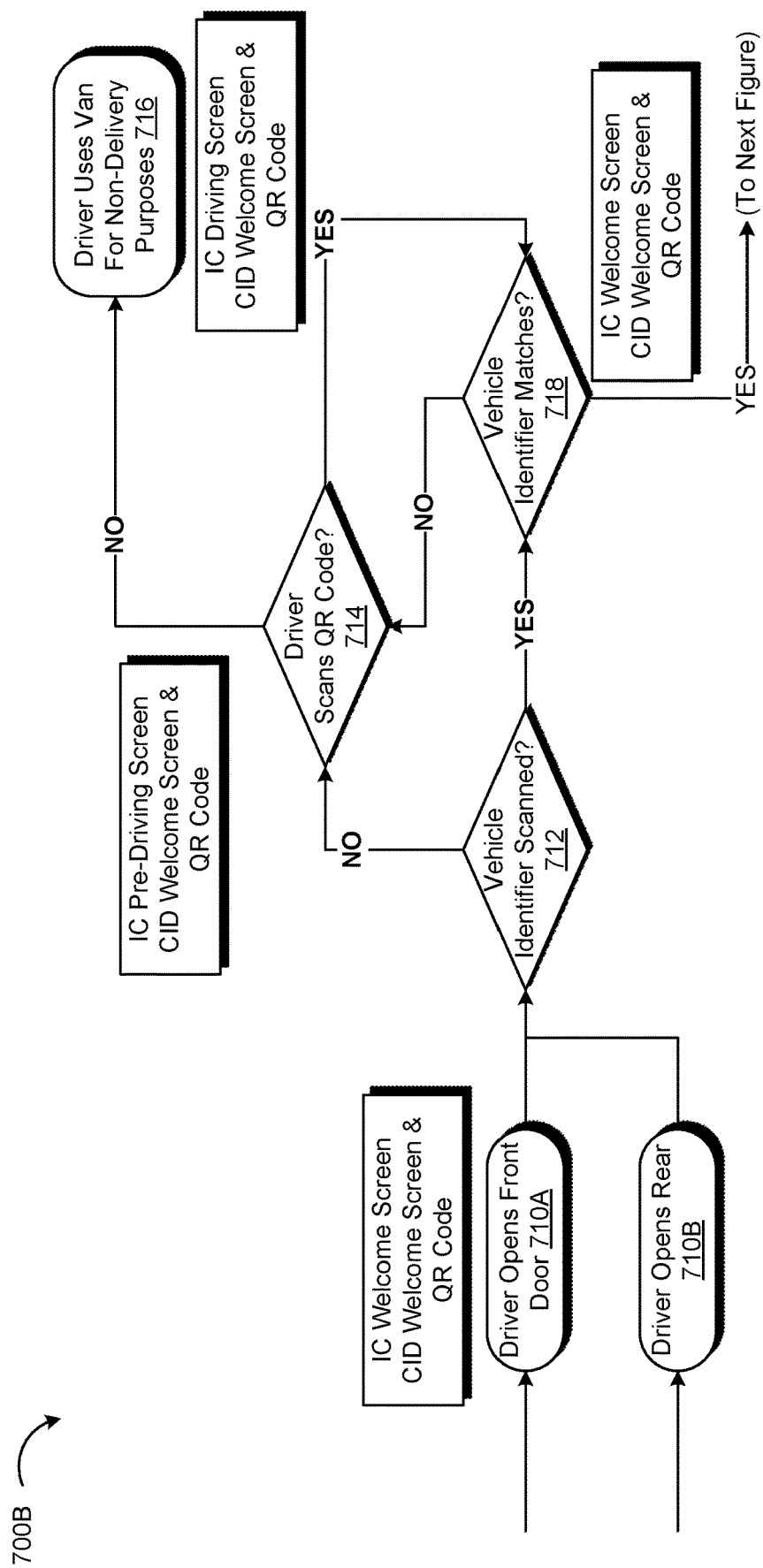
Figure 7C:
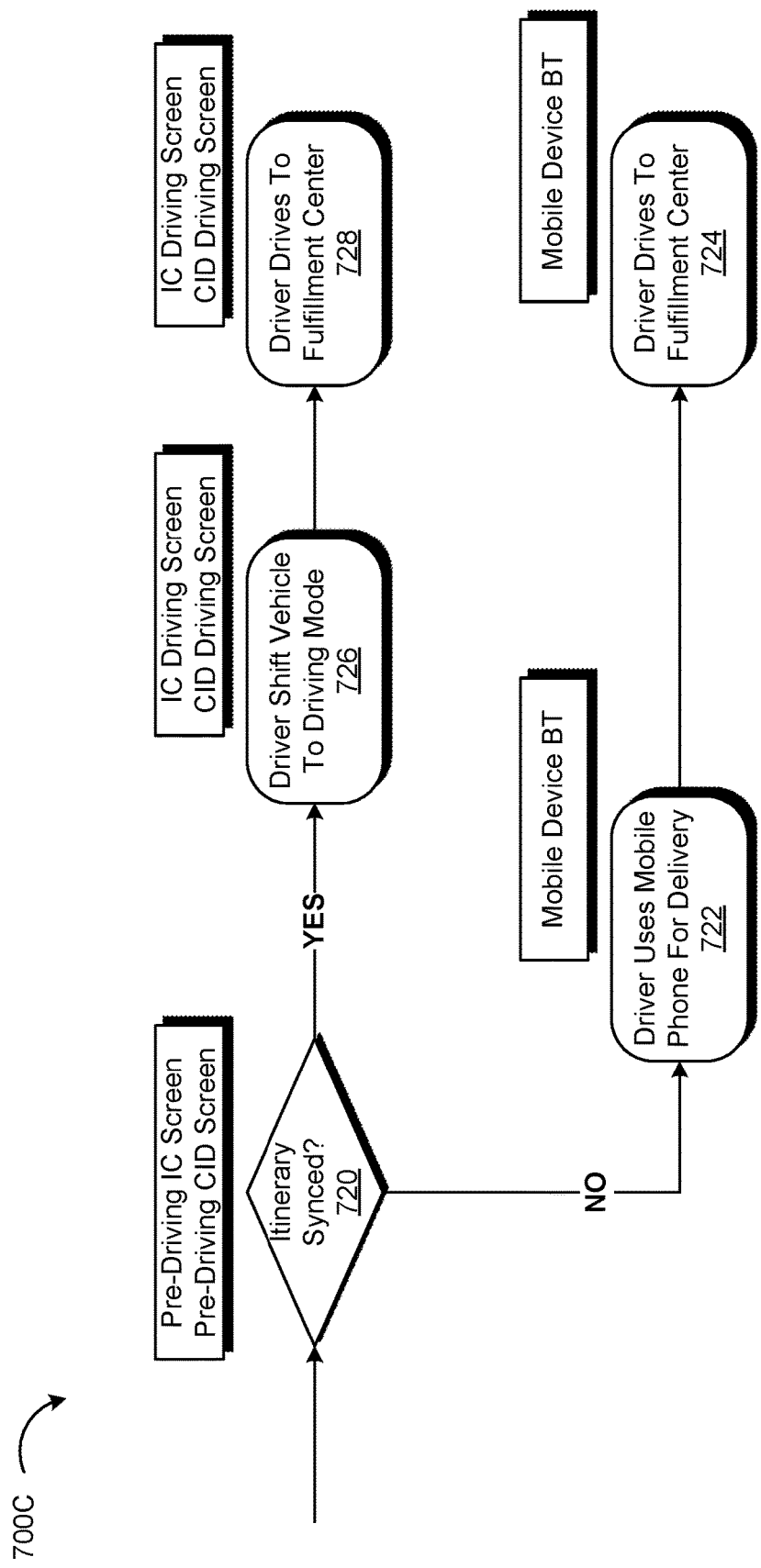

FIGS. 7A-C shows an illustrative example of a process for an initialization workflow for a delivery guidance and assistance system, in accordance with one or more example embodiments of the present disclosure. In at least one embodiment, some or all of the process 700A-C (or any other processes described herein, or variations and/or combinations thereof) is performed under the control of one or more computer systems that store computer-executable instructions and may be implemented as code (e.g., computer-executable instructions, one or more computer programs, or one or more applications) executing collectively on one or more processors, by hardware, software, or combinations thereof. The code, in at least one embodiment, is stored on a computer-readable storage medium in the form of a computer program comprising a plurality of computer-readable instructions executable by one or more processors.

The computer-readable storage medium, in at least one embodiment, is a non-transitory computer-readable medium. In at least one embodiment, at least some of the computer-readable instructions usable to perform the process 700A-C are not stored solely using transitory signals (e.g., a propagating transient electric or electromagnetic transmission). A non-transitory computer-readable medium does not necessarily include non-transitory data storage circuitry (e.g., buffers, caches, and queues) within transceivers of transitory signals. Process 700A-C may be implemented in the context of various systems and methods described elsewhere in this disclosure, such as those discussed in connection with FIGS. 1 and 10. In at least one embodiment, process 700A-C or a portion thereof is implemented by a delivery guidance and assistance system physically coupled or integrated into a vehicle.

As depicted in process 700A, at step 702, a driver approaches a vehicle according to at least one embodiment. While a driver is referenced in this step, any suitable personnel, including delivery personnel, pick-up personnel, and other agents, may also be utilized. At optional step 704, as denoted by the dashed lines, the driver may scan a vehicle identifier. For example, a vehicle VIN, license plate, or other identifying information may be scanned by the driver. A driver's mobile device may be used to scan the vehicle to confirm that the driver is attempting to utilize the correct vehicle. For example, in a fleet of delivery vehicles, it may be the case that several vehicles are in close proximity to each other.

Continuing, a determination may be made at step 706 to perform an authorization. The authorization may be made based on the driver having physical possession of a key-fob or other electronic device that emits a wireless signal that can be used to authenticate and/or authorize access. If a key-fob or other authentication/authorization mechanism is not detected, the process 700A may proceed to step 708 where a user may use a key to physically unlock the vehicle. If this is not done, then the process may simply end at this point until a means of obtaining proper entry to the vehicle is procured. However, if such means are detected, then the doors to the vehicle may be unlocked and entry to the vehicle is granted. In various embodiments, the vehicle comprises display screens such as an instrument cluster (IC) screen and a central information display (CID) screen. Screens such as those depicted in connection with FIG. 1 may be implemented in the context of process 700A. Exterior lights of the vehicle may be turned on or flash as a result of the doors being unlocked.

Process 700A may proceed to process 700B depicted in FIG. 7B. Once the doors to a vehicle have been unlocked, the driver may have the option to open various doors, hatches, trunks, etc. For example, a user may open a front door at step 710A or open a rear door at 710B. When the user opens the front door, the IC screen and CID screen may be activated and a welcome screen may be displayed on one or both display screens.

Vehicle sensor data may be used to determine the state of a vehicle. A package delivery guidance and assistance system may receive sensor data indicating that the door has been opened and use that signal to turn on one or more display screens and to display a welcome message. In some embodiments, an initialization process may involve displaying a quick response (QR) code that encodes vehicle identification information. Each delivery vehicle from a fleet of delivery vehicles may have a unique vehicle identification number (VIN) that is encoded in the QR code and may be used to verify that the delivery person has gotten into the right car.

At step 712, a determination may be made as to whether the vehicle identifier has been scanned. If the vehicle identifier has not been scanned, the driver may have the option to scan a QR code displayed on one or more of the vehicle's displays. At this point, the IC pre-driving screen may be displayed, and the CID welcome screen may continue to be displayed, for example, with a QR code that the user is prompted to scan. At step 714, a determination may be made as to whether the user has scanned the QR code. If the driver engages the vehicle for driving and still has not scanned the VIN or QR code, then it may be determined at step 716 that the driver is using the vehicle for non-delivery purposes. An IC driving screen may be displayed to facilitate driving functions, but the CID may remain on the welcome screen with the QR code. In various embodiments, the driver may have the ability to open other applications on the CID, such as navigation software, which may cause the CID welcome screen and QR code to be dismissed or minimized.

The QR code may encode the vehicle's VIN. If the VIN is scanned either directly at step 704 or through the QR code, step 718 may be performed to determine whether the vehicle identifier matches an expected identifier. For example, the driver may be assigned a particular vehicle and a VIN may be transmitted to the user's mobile device. The user may scan a vehicle's VIN or QR code and compare the scanned VIN or QR code to the expected VIN on the mobile device. If the two match, then a handshake process between the mobile device and the vehicle may be considered to be complete, and process 700B may proceed to process 700C depicted in FIG. 7C.

At process 700C, the vehicle may be in a pre-driving state as a result of the initial handshake or pairing process between the driver's mobile device and the vehicle's package delivery guidance and assistance system. In various embodiments, delivery information such as an itinerary list and delivery notes may be synchronized from the mobile device to the vehicle's package delivery guidance and assistance system. In various embodiments, the vehicle's package delivery guidance and assistance system has Bluetooth connectivity or other close range wireless connection that may be used to pair with the mobile device, but lacks a direct means for connecting to the Internet.

At step 720, the package delivery guidance and assistance system may determine whether the itinerary information was successfully synchronized. If it was not, then a retry may be performed, in some embodiments. If the package delivery guidance and assistance system is unable to receive the itinerary information after a predetermined number of retries, then the driver may revert to using the mobile device for delivery, as depicted in step 722. In such a scenario, the driver may proceed to step 724 and use the mobile device for navigation and drive to a fulfillment center to receive packages for delivery.

Conversely, if the itinerary information is successfully synchronized, then the driver may proceed to step 720 and use the vehicle's IC/CID screens for package delivery guidance and assistance. For example, driver may shift the vehicle to driving mode at step 726 and trigger IC driving screen (e.g., with turn-by-turn navigation instructions to a destination synchronized to the vehicle from the mobile device via Bluetooth) and then proceed to step 728 and drive to the fulfillment center.

A package delivery guidance and assistance platform may be based on various components: first, a client side, which the driver sees on the mobile device, for example, implemented as a mobile application; second, the architecture where everything is stored (data); third, a transaction service that pulls in data from the field based on events. Events may include deliveries, vehicle turns, enter geofence, missed delivery, and so forth. These events may all be recorded to a transaction service. A vehicle's package delivery guidance and assistance software can either take in the transaction or once the driver does an action on the mobile phone, send the transaction to the services. This two-way communication may be used to provide visibility into events occurring throughout the entire delivery network.

When the driver signs into the mobile device application, and there is a way to synchronize with the vehicle, which may be a specific vehicle with a specific VIN associated with the driver and route in the morning. The delivery driver may be assigned a VIN and a route and that will be known to the phone. Once the driver signs in, there may be a QR code in the vehicle that is to be scanned based on vehicle that is to be paired to the driver and a vehicle inspection occurs. Once the inspection is done, the driver is allowed to drive the vehicle, otherwise he will not be allowed to drive the vehicle.

Then, the driver goes to the delivery station, and once all the packages have been scanned into the vehicle through the mobile app, the vehicle is ready for delivery. Then, the route is loaded to the vehicle via Bluetooth by the mobile device.

Different vehicles may have different display types. For example, a vehicle with a single display may have integrated IC+CID functionality that is defined by graphical interface templates that account for the existence of only a single screen as opposed to two screens. For example, turn-by-turn information may be presented in a navigation region within a driving graphical interface.

FIGS. 8A-E shows an illustrative example of a process for a delivery workflow for a delivery guidance and assistance system, in accordance with one or more example embodiments of the present disclosure. In at least one embodiment, some or all of the process 800A-E (or any other processes described herein, or variations and/or combinations thereof) is performed under the control of one or more computer systems that store computer-executable instructions and may be implemented as code (e.g., computer-executable instructions, one or more computer programs, or one or more applications) executing collectively on one or more processors, by hardware, software, or combinations thereof. The code, in at least one embodiment, is stored on a computer-readable storage medium in the form of a computer program comprising a plurality of computer-readable instructions executable by one or more processors. The computer-readable storage medium, in at least one embodiment, is a non-transitory computer-readable medium. In at least one embodiment, at least some of the computer-readable instructions usable to perform the process 800A-E are not stored solely using transitory signals (e.g., a propagating transient electric or electromagnetic transmission). A non-transitory computer-readable medium does not necessarily include non-transitory data storage circuitry (e.g., buffers, caches, and queues) within transceivers of transitory signals. Process 800A-E may be implemented in the context of various systems and methods described elsewhere in this disclosure, such as those discussed in connection with FIGS. 1 and 10. In at least one embodiment, process 800A-E or a portion thereof is implemented by a delivery guidance and assistance system physically coupled or integrated to a vehicle. Process 800A may be performed in connection with processes described in connection with FIGS. 7A-C.

At step 802, a driver may load packages into a vehicle. The packages may be scanned by the driver or delivery person as they are being loaded onto the vehicle. Step 802 may be an optional step or may be performed by other entities. In some embodiments, the delivery vehicle is already loaded with packages when the driver arrives and begins the delivery routine.

At step 804, vehicle sensor data may be collected that indicates the driver has buckled the seat belt and is prepared to leave. While the vehicle is still parked, a pre-driving graphical interface may be displayed on IC screen and CID screen of the vehicle. If only a single screen is available for use on the vehicle, then the pre-driving graphical interface may be entirely displayed on that screen. In various embodiments, at step 806, the system determines whether the driver has made any changes to the itinerary. For example, the driver may interact directly with a CID touchscreen to re-order deliveries, group multiple deliveries into a single stop, and so forth. In various embodiments, the driver has the option to use the mobile application to change the itinerary order, as depicted in step 808, for example.

In various embodiments, if a change is detected, the IC and/or CID screens may be refreshed with updated route information at step 810. The driver may review the updated route and make further changes or commence deliveries with the route. The driver may shift the vehicle from park to drive at 812, which may signal that the pre-driving interface should be replaced by a driving interface.

Figure 8A:
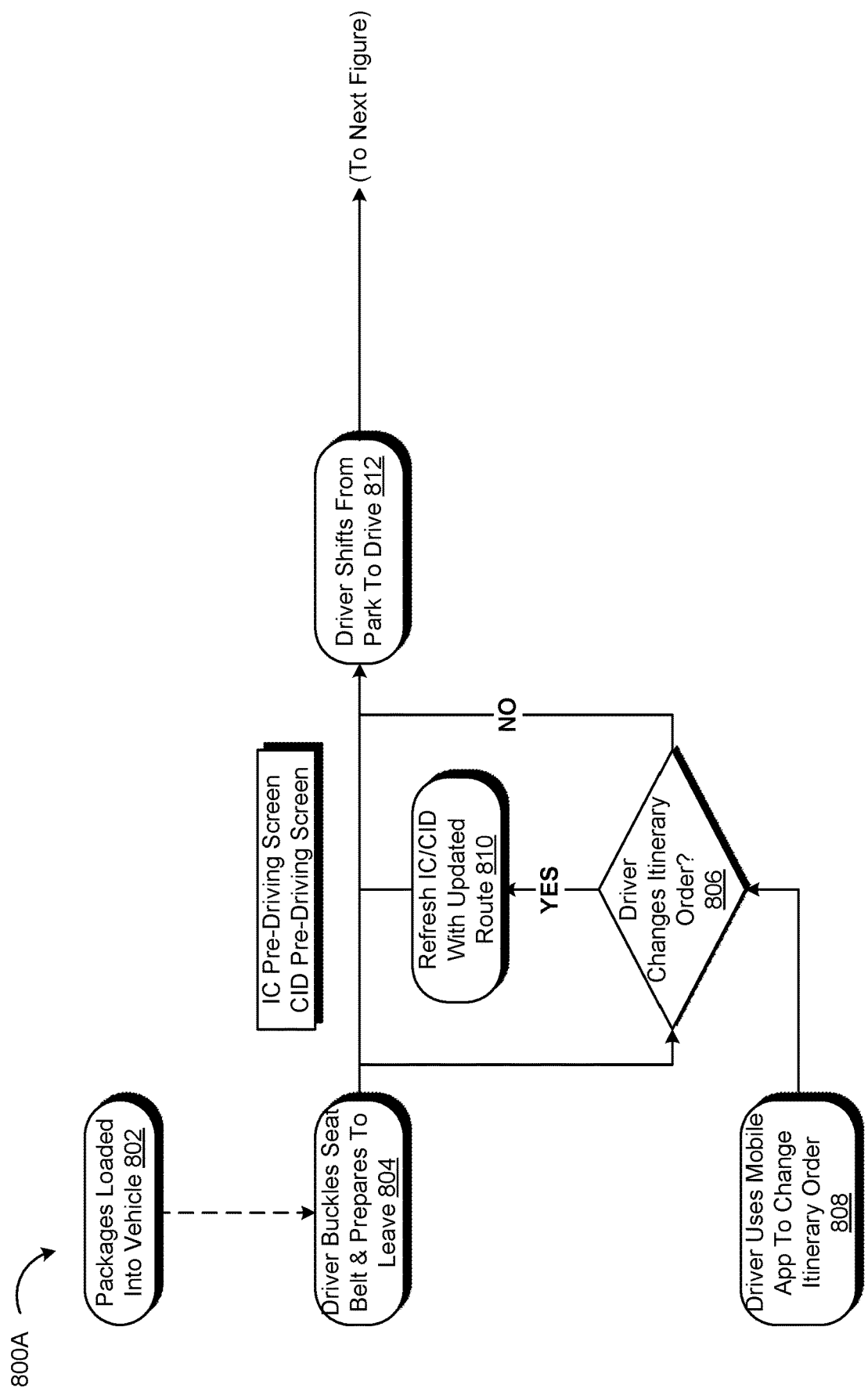
FIGS. 8A-E shows an illustrative example of a process for a delivery workflow for a delivery guidance and assistance system, in accordance with one or more example embodiments of the present disclosure.
Figure 8B:
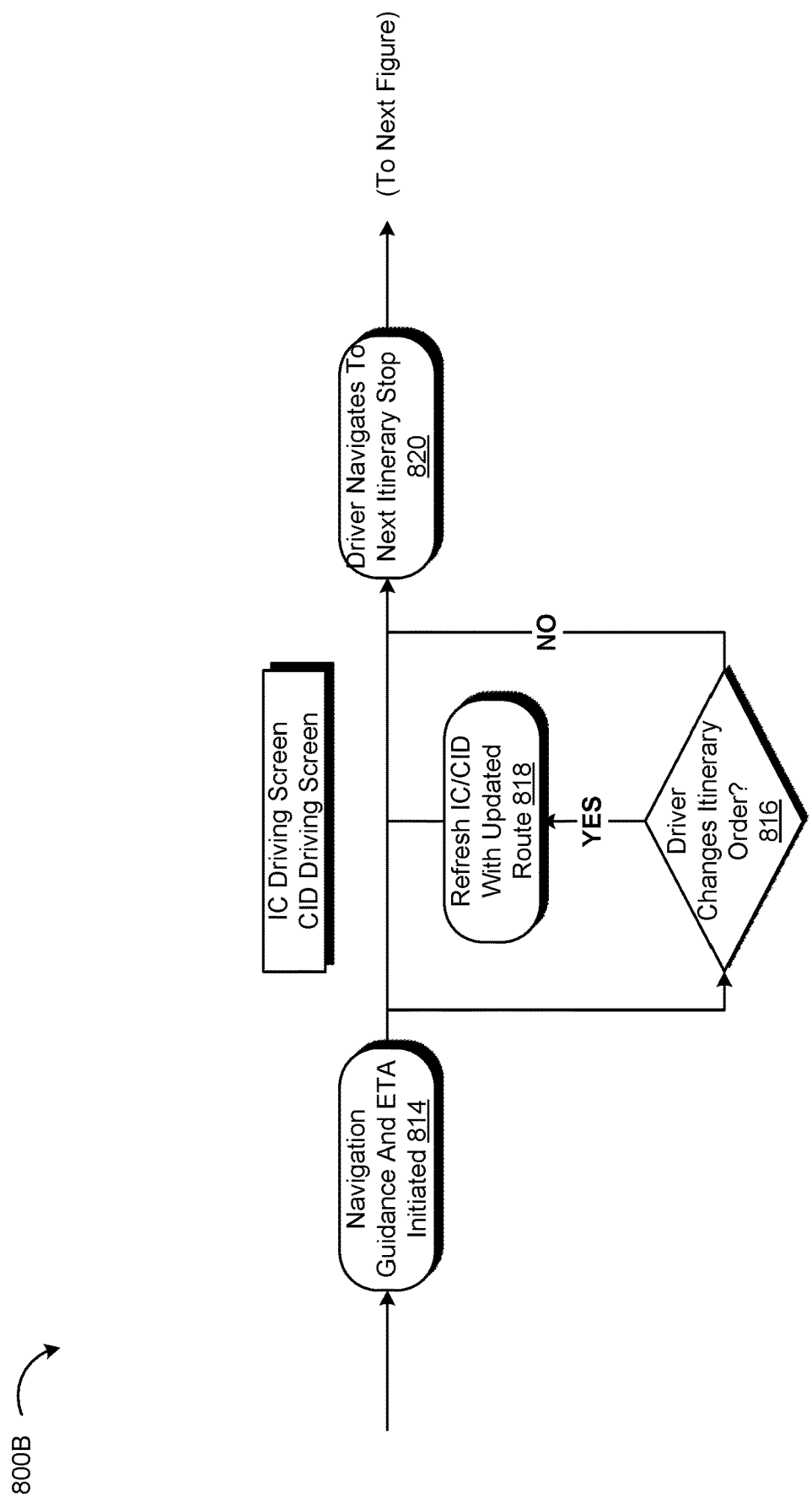

Process 800A may proceed to process 800B depicted in FIG. 8B. At step 814, navigation guidance and estimated arrival time (ETA) may be determined and displayed on the IC and/or CID screens. During this stage and throughout the steps depicted in FIG. 8B, a driving graphical interface may be displayed across both IC and CID screens. If the driver changes the itinerary order at step 816, the CID and/or IC screens may be refreshed with updated route information at step 818. The driver may navigate to the next itinerary stop at step 820. For example, turn-by-turn navigation instructions may be presented to the driver on the IC screen.

Figure 8C:
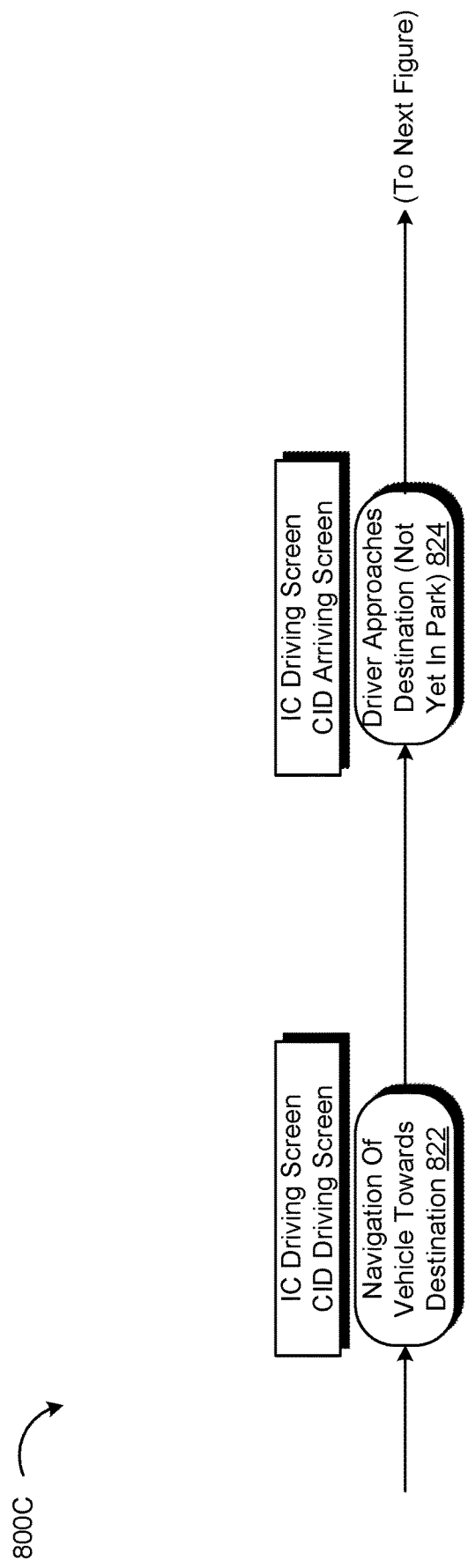

Process 800B may proceed to process 800C depicted in FIG. 8C. At step 822, the driver may drive the vehicle and perform navigation of the vehicle towards the itinerary destination. At step 824, the vehicle may be approaching the destination, but not arrived or parked yet. This may correspond to an arriving stage of the delivery. The arriving stage may be triggered based on various vehicle sensor data. For example, when the ETA to the destination is under 1 minute, the arriving state may be triggered. For example, when the vehicle enters a geofence centered or otherwise associated with the destination, the arriving state may be triggered. For example, if the vehicle speed decreases to under 5 miles per hour, the arriving state may be triggered. It should be noted that the IC's graphical interface may still be a driving interface while the CID's graphical interface changes to an arriving graphical interface while the vehicle is still in motion.

Figure 8D:
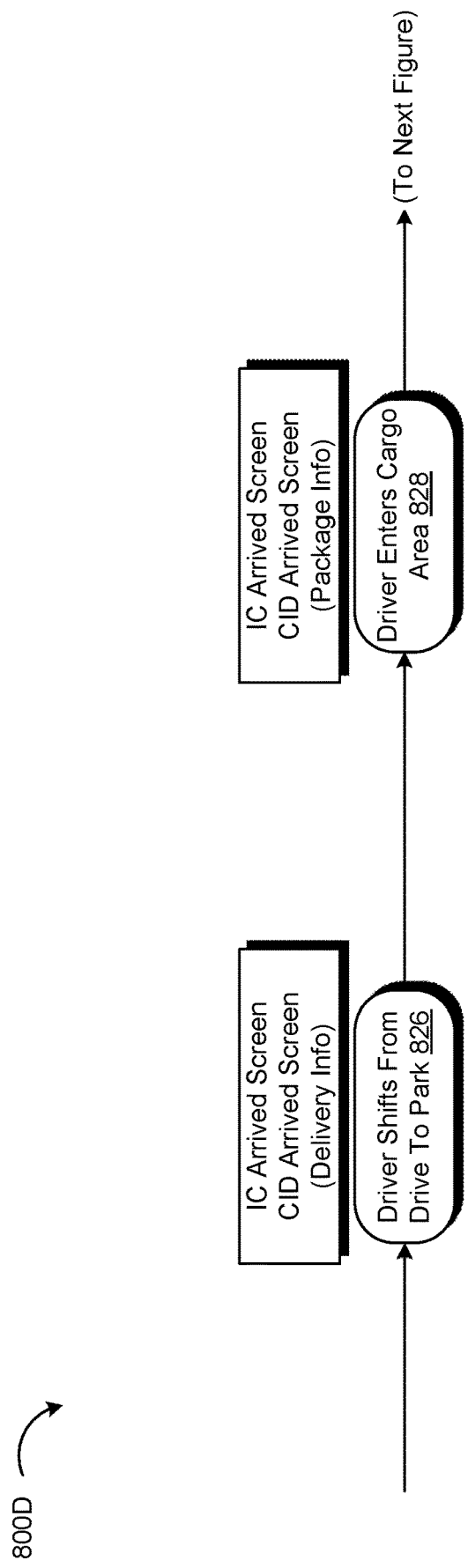

Process 800C may proceed to process 800D depicted in FIG. 8D. At step 826, the driver may shift the vehicle from a drive mode to a park mode. This vehicle data signal may cause the arrived state to be triggered. An IC and/or CID arrived screen may be presented to the user. At this state, the IC screen may be turned off as the driver has successfully navigated to the destination, and the CID screen may display a graphical interface with delivery information to assist the delivery person locate a set of delivery locations for the stop. For example, the arrived screen graphical interface for delivery info may present a map view with one or more pins that correspond to one or more deliveries for the stop. Information for other deliveries may be suppressed in this view. In various embodiments, vehicle sensor data may be collected at step 828 that the driver has entered a cargo area. The vehicle signal may indicate that the delivery person is in a package retrieval sub-task and to present an arrived screen graphical interface for package information. The package retrieval information presented in the graphical interface may include information that assists the delivery person with locating packages in a cargo area or storage area. For example, the graphical interface may include UI cards for each delivery that is scheduled for the stop, as well as package identification information (e.g., package type, name or address information, package identifier). In various embodiments, delivery notes are presented to the delivery person, which may include a passcode for entering a restricted space, notes on whether a signature receipt is required, and so forth.

Figure 8E:
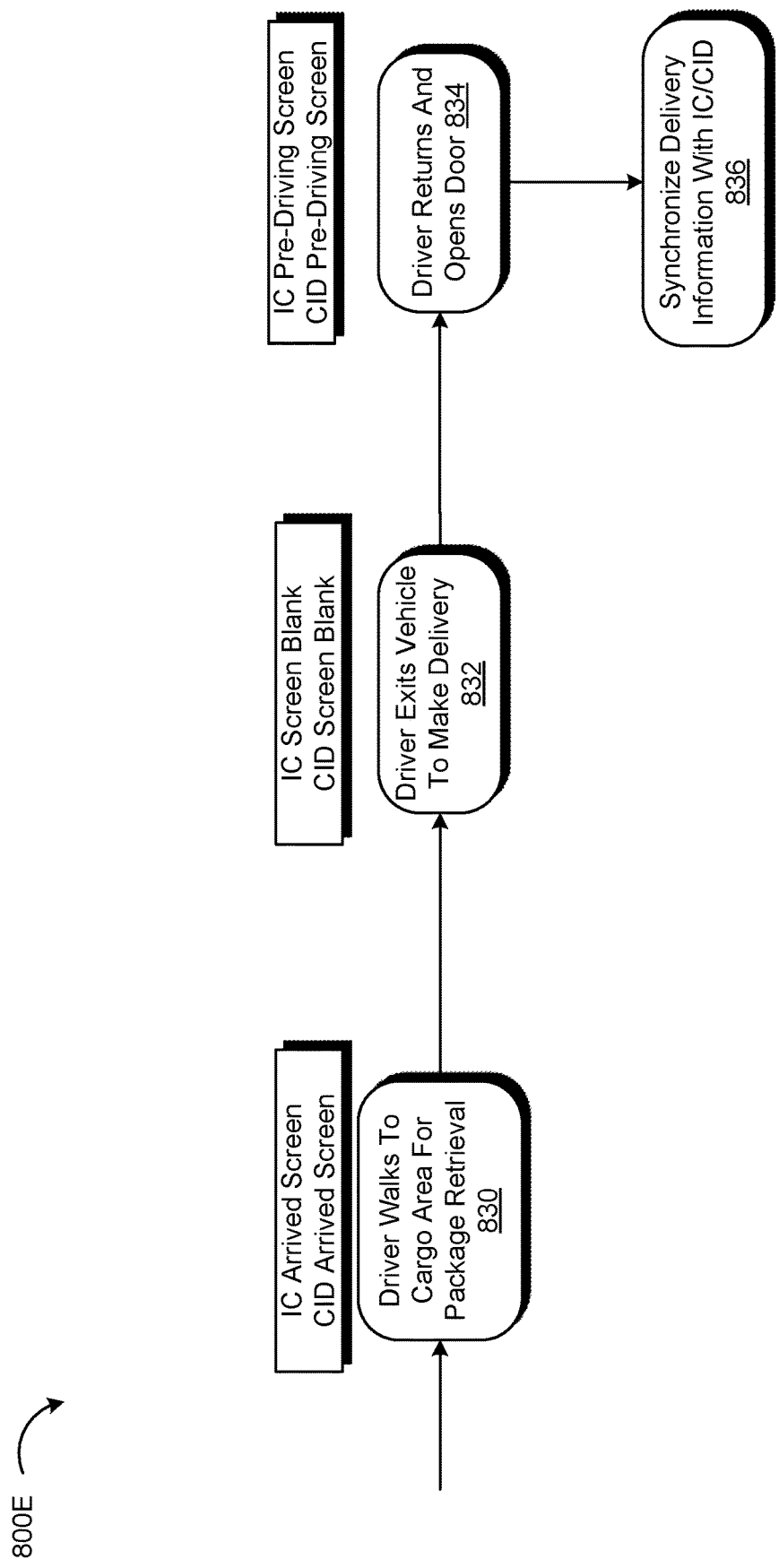

Process 800D may proceed to process 800E depicted in FIG. 8E. At step 830, the driver or delivery person may walk to the cargo area for package retrieval. As noted in connection with FIG. 8D, the CID screen may display package retrieval information in an oversized format with a lower content density that is calculated based on the intended viewing distance of the screen. The greater the intended viewing distance, the larger the font size, generally. In various embodiments, the driver or delivery person retrieves the packages to be delivered and exits the vehicle to make the delivery at step 832. In some embodiments, a temporary security token is provided for the delivery of a package. For example, if the delivery location is a home with an Internet-connected smart lock, the delivery person may transmit a request to a smart home cloud service to provide access to the home. The smart home cloud service may authenticate and/or authorize the request and transmit a temporary security token to the delivery person. The temporary security token may be in the form of a one-time use passcode that is only valid for a brief period of time that grants access to the delivery person to drop off a package within a residence or other restricted location. Security cameras or other recording devices may be enabled within the restricted location when the request is made, so as to ensure that the delivery is made properly and securely. In various embodiments, a key fob for operating the delivery vehicle emits a wireless signal such as a radio frequency (RF) or infrared (IR) signal and the signal is used to determine when the driver has exited the vehicle and is making a delivery. If the key fob is removed from the vehicle and can no longer be detected by the vehicle, then the IC and/or CID screens may be de-activated. Other techniques may be used to determine whether to turn off the display—for example, the IC and/or CID screen may be de-activated or turned off in response to a timeout or period of inactivity, for example, 10 minutes. When the user makes the delivery, the mobile device may be used to transmit a delivery status updated associated with the delivery. For example, if the package was successfully delivered, that information may be relayed to a transaction server, which may then be used to generate a delivery notification for the package's intended recipient.

At step 834, the driver may return to the vehicle and open the door. When such vehicle sensor data is detected, it may indicate that the driver is ready to proceed to the next stop. In some embodiments, the system will perform step 836 to synchronize delivery information from the mobile device to determine whether the delivery was successful or not and update the graphical interface accordingly. At this point, the delivery guidance and assistance system may return to a pre-driving state. The driver may then proceed to the next delivery by repeating some or all of the steps depicted in FIGS. 8A-E.

Figure 9:
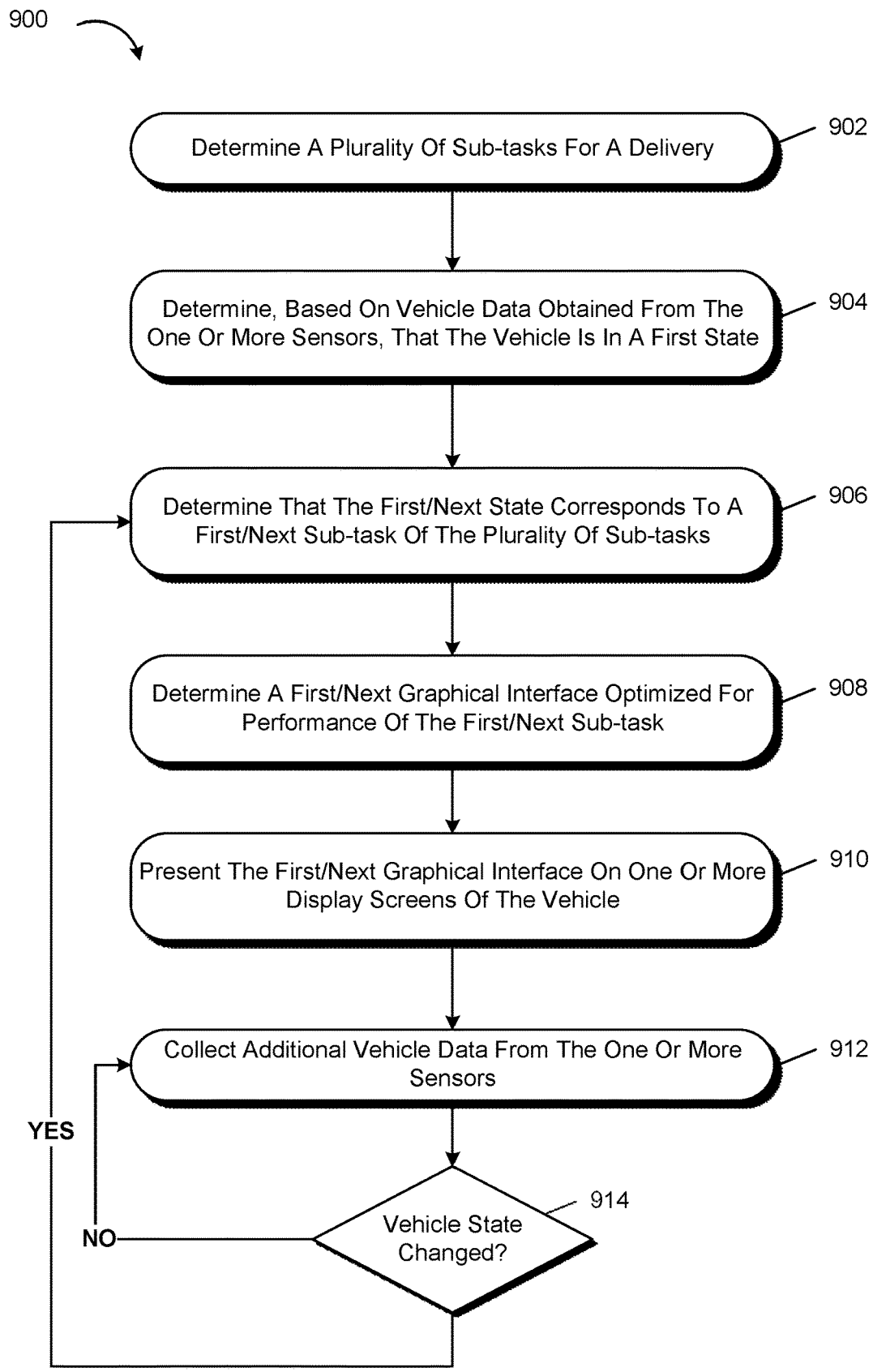
FIG. 9 shows an illustrative example of a process for presenting graphical interfaces optimized for different sub-tasks, in accordance with one or more example embodiments of the present disclosure.

FIG. 9 shows an illustrative example of a process 900 for presenting graphical interfaces optimized for different sub-tasks, in accordance with one or more example embodiments of the present disclosure. In at least one embodiment, some or all of the process 900 (or any other processes described herein, or variations and/or combinations thereof) is performed under the control of one or more computer systems that store computer-executable instructions and may be implemented as code (e.g., computer-executable instructions, one or more computer programs, or one or more applications) executing collectively on one or more processors, by hardware, software, or combinations thereof. The code, in at least one embodiment, is stored on a computer-readable storage medium in the form of a computer program comprising a plurality of computer-readable instructions executable by one or more processors. The computer-readable storage medium, in at least one embodiment, is a non-transitory computer-readable medium. In at least one embodiment, at least some of the computer-readable instructions usable to perform the process 900 are not stored solely using transitory signals (e.g., a propagating transient electric or electromagnetic transmission). A non-transitory computer-readable medium does not necessarily include non-transitory data storage circuitry (e.g., buffers, caches, and queues) within transceivers of transitory signals. Process 900 may be implemented in the context of various systems and methods described elsewhere in this disclosure, such as those discussed in connection with FIGS. 1 and 10. In at least one embodiment, process 900 or a portion thereof is implemented by a delivery guidance and assistance system physically coupled or integrated to a vehicle.

In at least one embodiment, process 900 comprises a step 902 to determine a plurality of sub-tasks for a delivery. The sub-tasks may be various activities that are to be performed as part of a successful delivery. In various embodiments described herein, vehicle data is collected from one or more sensors integrated in a delivery vehicle and deliveries are organized into sub-tasks. A sub-task being performed is determined based on vehicle sensor data, and a corresponding graphical interface optimized for performance of said sub-task is selected and presented to a user. Sensor data may be continuously collected and used to identify when one sub-task is completed and another commences, at which point a new graphical interface may be presented to aid in the performance of the next sub-task. By using such techniques, deliveries can be made safer and more efficient, and result in better user experience through the elimination of manual interactions that would otherwise have been necessary.

In at least one embodiment, process 900 comprises a step 904 to determine, based on vehicle data obtained from one or more sensors, that the vehicle is in a first state. For example, vehicle sensor data may be used to identify when the vehicle is in a pre-driving state. For example, when the delivery person opens the driver-side door, a sensor may detect that the door has been opened and/or closed, and such signals may be used to determine or infer that a delivery person is in a pre-driving state.

Vehicle sensor data may be used to determine when the delivery person and/or vehicle is no longer in a pre-driving state and transitions into a driving state. The determination may be programmatically made based on vehicle sensor data, for example, based on an engine ignition signal, based on the vehicle shifting from park to drive, based on vehicle movement, and so forth. These are non-limiting examples of how to determine that a vehicle is in a driving state.

In at least one embodiment, process 900 comprises a step 906 to determine that the first state corresponds to a first sub-task of the plurality of sub-tasks. Sub-tasks may be associated with each state. For example, pre-driving state may involve a sub-task related to planning that involves identifying a suitable delivery route, determining whether deliveries to multiple destinations can be performed in a single stop, and so forth.

In at least one embodiment, process 900 comprises a step 908 to determine a first graphical interface optimized for performance of the first sub-task. For example, the pre-driving interface may provide the driver with stop and route overview information that is optimized to aid the driver in preparing for upcoming deliveries. For example, the map may provide an A-to-B route in one view that shows the vehicle's current location, a proposed route to a destination, the next stop after that, and the map may be locked such that the map UI will not move but the vehicle location icon will move when the driver interacts with the screen. In various embodiments, the pre-driving graphical interface will display the next one, next two, next three, etc. delivery locations, which may be helpful to the delivery person for the planning a group of deliveries.

In at least one embodiment, process 900 comprises a step 910 to present the first graphical interface on one or more display screens of the vehicle. For example, a multi-screen package delivery guidance and assistance system may include an IC screen and a CID screen both of which may be used to present the first graphical interface. However, in other embodiments, a single-screen package delivery guidance and assistance system may have only one screen dedicated for presenting the first graphical interface.

In at least one embodiment, process 900 comprises a step 912 to collect additional sensor data from the one or more sensors. Vehicle sensor data may be continuously collected and provided to the package delivery guidance and assistance system so that the system is able to detect state changes. In at least one embodiment, process 900 comprises a step 914 determines whether a state change has occurred. Vehicle sensor data may be used to determine when the state or stage of delivery changes. For example, when a delivery person shifts the vehicle from park to drive, such data may be collected by a sensor and provided to the package delivery guidance and assistance system. This signal may be used to transition from a pre-driving or planning state to a driving or navigation state. The pre-driving graphical interface may be replaced by a driving or navigation graphical interface that is optimized for navigation to a destination. When the vehicle is approaching the destination—for example, when the vehicle enters a geofence associated with the destination—the graphical interface may change again to an arriving graphical interface that is optimized for assisting the driver to find a good place to park and the prepare for a delivery, pickup, or other task that is to be performed at the destination. Once the vehicle has parked, the graphical interface may be updated to display a different graphical interface layout that is optimized for package retrieval, for example, displaying information regarding the size or type of the package, address or recipient information, which bin or section of the cargo area of the vehicle to find the package, and so forth.

One or more operations of the methods, process flows, or use cases of FIGS. 1-10 may have been described above as being performed by a user device, or more specifically, by one or more program module(s), applications, or the like executing on a device. It should be appreciated, however, that any of the operations of the methods, process flows, or use cases of FIGS. 1-10 may be performed, at least in part, in a distributed manner by one or more other devices, or more specifically, by one or more program module(s), applications, or the like executing on such devices. In addition, it should be appreciated that processing performed in response to execution of computer-executable instructions provided as part of an application, program module, or the like may be interchangeably described herein as being performed by the application or the program module itself or by a device on which the application, program module, or the like is executing. While the operations of the methods, process flows, or use cases of FIGS. 1-10 may be described in the context of the illustrative devices, it should be appreciated that such operations may be implemented in connection with numerous other device configurations.

The operations described and depicted in the illustrative methods, process flows, and use cases of FIGS. 1-10 may be carried out or performed in any suitable order, such as the depicted orders, as desired in various example embodiments of the disclosure. Additionally, in certain example embodiments, at least a portion of the operations may be carried out in parallel. Furthermore, in certain example embodiments, less, more, or different operations than those depicted in FIGS. 1-10 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

The examples presented herein are not meant to be limiting.

FIG. 10 illustrates a block diagram of an example of a machine 1000 (e.g., implemented in whole or in part in the context of embodiments described in connection with other figures. In some embodiments, the machine 1000 may operate as a standalone device or may be connected (e.g., networked) to other machines. In a networked deployment, the machine 1000 may operate in the capacity of a server machine, a client machine, or both in server-client network environments. In an example, the machine 1000 may act as a peer machine in Wi-Fi direct, peer-to-peer (P2P) (or other distributed) network environments. The machine 1000 may be a wearable device or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 1000 may include any combination of the illustrated components. For example, the machine 1000 may include a hardware processor 1002 (e.g., a central processing unit (CPU), a graphics processing unit (GPU), a hardware processor core, or any combination thereof), a main memory 1004 and a static memory 1006, some or all of which may communicate with each other via an interlink (e.g., bus) 1008. The machine 1000 may further include a power management device 1032, a graphics display device 1010, an alphanumeric input device 1012 (e.g., a keyboard), and a user interface (UI) navigation device 1014 (e.g., a mouse). In an example, the graphics display device 1010, alphanumeric input device 1012, and UI navigation device 1014 may be a touch screen display. The machine 1000 may additionally include a storage device (e.g., drive unit) 1016, a signal generation device 1018, and a network interface device/transceiver 1020 coupled to antenna(s) 1030. The machine 1000 may include an output controller 1034, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, other sensors, etc.)).

Delivery guidance and assistance subsystem 1036 may be utilized to implement various functionality for processing vehicle sensor data and determining suitable graphical interfaces based on the current state or sub-task that is being performed, as indicated by the sensor data. Delivery guidance and assistance subsystem 1036 may be utilized to implement various functionality described in connection with FIGS. 1-9.

The storage device 1016 may include a machine readable medium 1022 on which is stored one or more sets of data structures or instructions 1024 (e.g., software) embodying or utilized by any one or more of the techniques or functions described herein. The instructions 1024 may also reside, completely or at least partially, within the main memory 1004, within the static memory 1006, or within the hardware processor 1002 during execution thereof by the machine 1000. In an example, one or any combination of the hardware processor 1002, the main memory 1004, the static memory 1006, or the storage device 1016 may constitute machine-readable media.

While the machine-readable medium 1022 is illustrated as a single medium, the term "machine-readable medium" may include a single medium or multiple media (e.g., a centralized or distributed database, and/or associated caches and servers) configured to store the one or more instructions 1024.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 1000 and that cause the machine 1000 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 1024 may further be transmitted or received over a communications network 1026 using a transmission medium via the network interface device/transceiver 1020 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 1020 may include one or more physical jacks (e.g., Ethernet, coaxial, or phone jacks) or one or more antennas to connect to the communications network 1026. In an example, the network interface device/transceiver 1020 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 1000 and includes digital or analog communications signals or other intangible media to facilitate communication of such software.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, biomedical sensors, wearable devices or sensors, cellular radiotelephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

It is understood that the above descriptions are for purposes of illustration and are not meant to be limiting.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in any applicable flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in any flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which may be used to store the information and which may be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, the term "plurality" indicates a state of being plural (e.g., "a plurality of items" indicates multiple items). The number of items in a plurality is at least two, but can be more when so indicated either explicitly or by context.

Additionally, features of various system and methods described herein that are implemented "by" or "based on" performing a step are to be construed or may be synonymous to "by at least" or "based at least in part on" performing said step rather than "by solely" or "based solely on" performing said step, unless it is explicitly stated or clear from the context. For example, a system that implements specific features "by" performing a particular step may be described in a manner that is not exclusive of the performance of other steps, some of which may be related to said particular step. In some cases, other steps may omitted from various discussions for the sake of clarity.

What is claimed is:

1. A method, comprising:
   obtaining, at a mobile device, vehicle identification information for a delivery vehicle of a fleet of delivery vehicles, wherein the delivery vehicle comprises a plurality of sensors;
   performing a handshake process between the mobile device and the delivery vehicle, wherein the handshake process comprises using the mobile device to scan a code that is unique to the delivery vehicle;
   synchronizing delivery information from the mobile device with the delivery vehicle;
   determining, from the delivery information, a delivery route comprising at least a first delivery;
   determining, based on first vehicle sensor data obtained from the plurality of sensors, that the delivery vehicle is in a pre-driving state;
   selecting, based on the determination of the pre-driving state, a first graphical user interface for presentation of the delivery route;
   presenting, on at least one display of the delivery vehicle, the first graphical user interface on one or more screens of the delivery vehicle;
   collecting second vehicle sensor data from the plurality of sensors;
   determining, based on the second vehicle sensor data, that the delivery vehicle is in a driving state;
   selecting, based on the determination of the driving state, a second graphical user interface for navigation of the delivery vehicle to a first geolocation for the first delivery;
   replacing the first graphical user interface with the second graphical user interface;
   collecting third vehicle sensor data from the plurality of sensors;
   determining, based on the third vehicle sensor data, that the delivery vehicle is in an arriving state;
   selecting, based on the determination of the arriving state, a third graphical user interface for facilitating the first delivery at the first geolocation;

replacing the second graphical user interface with the third graphical user interface;
collecting fourth vehicle sensor data from the plurality of sensors;
determining, based on the fourth vehicle sensor data, that the delivery vehicle is in a delivery state;
selecting, based on the determination of the delivery state, a fourth graphical user interface for identification of a first package to be delivered at the first geolocation; and
replacing the third graphical user interface with the fourth graphical user interface.

2. The method of claim 1, wherein:
the first vehicle sensor data comprises first data indicating that the delivery vehicle is shifted in a park position;
the second vehicle sensor data comprises second data indicating that the delivery vehicle is shifted in a drive position;
the third vehicle sensor data comprises third data, obtained from a global positioning system (GPS) of the delivery vehicle, indicating that the delivery vehicle is within a first geofence associated with the first geolocation; and
the fourth vehicle sensor data comprises fourth data indicating that the delivery vehicle is shifted in the park position and within the first geofence.

3. The method of claim 1, further comprising:
collecting fifth vehicle sensor data from the plurality of sensors indicating that the first package is being delivered; and
de-activating the at least one display in response to a timeout.

4. The method of claim 3, further comprising:
synchronizing second delivery information from the mobile device with the delivery vehicle, the second delivery information associated with a first delivery status of the first package;
updating the delivery route based on the second delivery information;
collecting sixth vehicle sensor data from the plurality of sensors indicating that the delivery vehicle is in a pre-driving state; and
in response to the sixth vehicle sensor data, re-activating the at least one display with the first graphical user interface.

5. A vehicle, comprising:
one or more processors; and
memory storing executable instructions that, when executed by the one or more processors, cause the one or more processors to:
determine a plurality of sub-tasks for a delivery;
determine, based on first vehicle data obtained from one or more sensors associated with the vehicle, that the vehicle is in a first state;
determine that the first state corresponds to a first sub-task of the plurality of sub-tasks;
determine a first graphical interface for performance of the first sub-task;
present the first graphical interface on a first display screen of the vehicle;
responsive to second vehicle data obtained from the one or more sensors indicating that the vehicle is in a second state:
determine that the second state corresponds to a second sub-task of the plurality of sub-tasks; and
update the first display screen with a second graphical interface that is for performance of the second sub-task; and responsive to third vehicle data obtained from the one or more sensors indicating that the vehicle is in a third state:
determine that the third state corresponds to a third sub-task of the plurality of sub-tasks; and
update the first display screen with a third graphical interface that is for performance of the third sub-task,
wherein the first state, second state and third state are respectively one of a pre-driving state, arrival state, delivery planning state, or delivery state.

6. The vehicle of claim 5, wherein the first graphical interface is presented across two or more display screens.

7. The vehicle of claim 6, wherein:
a first portion of the first graphical interface with navigation-related information is presented on the first display screen located on an instrument cluster of the vehicle; and
a second portion of the first graphical interface with delivery-related information is presented on a second display screen located on an information display of the vehicle.

8. The vehicle of claim 6, wherein at least one of the two or more display screens is a transparent heads-up display (HUD).

9. The vehicle of claim 5, wherein the executable instructions, when executed by the one or more processors, cause the one or more processors to:
present a quick response (QR) code that encodes vehicle identification information; and
establish, based on the QR code, a wireless connection with a mobile device; and
receive route information for the delivery from the mobile device.

10. The vehicle of claim 5, wherein the executable instructions, when executed by the one or more processors, cause the one or more processors to:
receive data indicative of third-party delivery information associated with the delivery; and
present the third-party delivery information in a widget of the first graphical interface.

11. The vehicle of claim 5, wherein the executable instructions, when executed by the one or more processors, cause the one or more processors to:
detect that the vehicle is approaching a destination for the delivery; and
present delivery information on the first display screen.

12. The vehicle of claim 11, wherein the delivery information comprises at least one of graphical information depicting a drop-off location for the delivery or text-based delivery instructions.

13. A non-transitory computer-readable storage medium storing executable instructions that, as a result of being executed by one or more processors of a system, cause the system to at least:
determine a plurality of sub-tasks for a delivery;
determine, based on vehicle data obtained from one or more sensors of a vehicle, that the vehicle is in a first state;
determine that the first state corresponds to a first sub-task of the plurality of sub-tasks;
determine a first graphical interface for performance of the first sub-task;
present the first graphical interface on a first display screen of the vehicle;

responsive to additional vehicle data obtained from the one or more sensors indicating that the vehicle is in a second state:
  determine that the second state corresponds to a second sub-task of the plurality of sub-tasks; and
  update the first display screen with a second graphical interface that is for performance of the second sub-task; and
responsive to third vehicle data obtained from the one or more sensors indicating that the vehicle is in a third state:
  determine that the third state corresponds to a third sub-task of the plurality of sub-tasks; and
  update the first display screen with a third graphical interface that is for performance of the third sub-task,
wherein the first state, second state and third state are respectively one of a pre-driving state, an arrival state, a delivery planning state, or a delivery state.

14. The non-transitory computer-readable storage medium of claim 13, wherein the first graphical interface is presented across two or more display screens of the vehicle.

15. The non-transitory computer-readable storage medium of claim 14, wherein:
  a first portion of the first graphical interface with navigation-related information is presented on the first display screen located on an instrument cluster of the vehicle; and
  a second portion of the first graphical interface with delivery-related information is presented on a second display screen located on an information display of the vehicle.

16. The non-transitory computer-readable storage medium of claim 13, wherein the first graphical interface has a first content density that is greater than a second content density of the second graphical interface.

17. The non-transitory computer-readable storage medium of claim 13, wherein the instructions, as a result of being executed by the one or more processors of the system, further cause the system to:
  present a quick response (QR) code that encodes vehicle identification information; and
  establish, based on the QR code, a wireless connection with a mobile device; and
  receive route information for the delivery from the mobile device.

18. The non-transitory computer-readable storage medium of claim 13, wherein the instructions, as a result of being executed by the one or more processors of the system, further cause the system to:
  receive third-party delivery information associated with the delivery; and
  present the third-party delivery information in a widget of the first graphical interface.

19. The non-transitory computer-readable storage medium of claim 13, wherein the instructions, as a result of being executed by the one or more processors of the system, further cause the system to:
  detect that the vehicle is approaching a destination for the delivery; and
  present delivery information on the first display screen.

20. The non-transitory computer-readable storage medium of claim 19, wherein the delivery information comprises at least one of graphical information depicting a drop-off location for the delivery or text-based delivery instructions.

\* \* \* \* \*